United States Patent
Zhang et al.

(10) Patent No.: US 11,894,918 B2
(45) Date of Patent: Feb. 6, 2024

(54) METHOD AND APPARATUS FOR TRANSMITTING CONFIGURATION INFORMATION, STORAGE MEDIUM, AND SYSTEM

(71) Applicant: ZTE CORPORATION, Guangdong (CN)

(72) Inventors: Yuanbin Zhang, Guangdong (CN); Yan Yuan, Guangdong (CN)

(73) Assignee: ZTE Corporation, Guangdong (CN)

(*) Notice: Subject to any disclaimer, the term of this patent is extended or adjusted under 35 U.S.C. 154(b) by 0 days.

(21) Appl. No.: 17/426,157

(22) PCT Filed: Jan. 17, 2020

(86) PCT No.: PCT/CN2020/072603
§ 371 (c)(1),
(2) Date: Jul. 28, 2021

(87) PCT Pub. No.: WO2020/156216
PCT Pub. Date: Aug. 6, 2020

(65) Prior Publication Data
US 2022/0103283 A1 Mar. 31, 2022

(30) Foreign Application Priority Data
Jan. 28, 2019 (CN) .......................... 201910080760.0

(51) Int. Cl.
*H04J 3/16* (2006.01)

(52) U.S. Cl.
CPC ..... *H04J 3/1664* (2013.01); *H04J 2203/0058* (2013.01)

(58) Field of Classification Search
CPC .................................................. H04J 3/1664
See application file for complete search history.

(56) References Cited

U.S. PATENT DOCUMENTS

2011/0096790 A1* 4/2011 Sugai ................ H04L 49/10
370/412
2013/0028613 A1* 1/2013 Taki ................... H04J 3/1652
398/182

(Continued)

FOREIGN PATENT DOCUMENTS

| CN | 1774117 A | 5/2006 |
|---|---|---|
| CN | 101547055 A | 9/2009 |

(Continued)

OTHER PUBLICATIONS

The Second Office Action, dated Jul. 18, 2022, for Chinese Patent Application No. CN2019100807600 (12 pages).

(Continued)

*Primary Examiner* — Nathan M Cors
(74) *Attorney, Agent, or Firm* — KDW Firm PLLC

(57) ABSTRACT

Provided are a method and apparatus for transmitting configuration information, a storage medium and a system. The method for transmitting configuration information includes: mapping a client signal into a predetermined container corresponding to the client signal; encoding configuration information of the predetermined container according to a predetermined format; and sending the optical transport (Continued)

network frame that carries the predetermined container and the encoded configuration information of the predetermined container in the payload area.

17 Claims, 6 Drawing Sheets

(56) References Cited

U.S. PATENT DOCUMENTS

| | | | |
|---|---|---|---|
| 2013/0243428 A1* | 9/2013 | Mutoh | H04J 14/0287 398/43 |
| 2017/0063491 A1 | 3/2017 | Bruckman et al. | |
| 2018/0075152 A1 | 3/2018 | Zhang | |
| 2018/0098076 A1* | 4/2018 | Su | H04J 3/1658 |

FOREIGN PATENT DOCUMENTS

| | | | | |
|---|---|---|---|---|
| CN | 102238439 | A | 11/2011 | |
| CN | 103595515 | * | 2/2014 | H04J 14/0256 |
| CN | 106712893 | A | 5/2017 | |
| CN | 106788855 | A | 5/2017 | |
| CN | 106992838 | A | 7/2017 | |
| CN | 107040314 | A | 8/2017 | |
| CN | 107533846 | A | 1/2018 | |
| CN | 108432158 | A | 8/2018 | |
| EP | 2237457 | A2 | 10/2010 | |
| EP | 3920438 | A1 | 12/2021 | |

OTHER PUBLICATIONS

The Supplemental Search Report, dated Jul. 11, 2022, for Chinese Patent Application No. CN2019100807600 (three (3) pages).
Office Action for Chinese Application No. 201910080760.0 dated Jan. 27, 2022, 12 pages.
Search Report for Chinese Application No. 2019100807600, dated Jan. 27, 2022, 3 pages.
European Search Report dated Nov. 8, 2022, for Application No. EP20749750.4 (11 pages).
ZTE Corporation, "A new division scheme of OTN frame format", ITU-T Draft; Study Period 2017-2020; Study Group 15, series C.0475 International Telecommunication Union, Geneva, CH, vol. 11/15, 12/15, pp. 1-4, Jan. 16, 2018.
ZTE Corporation, "A method of transporting OSU configuration information", TU-T Draft; Study Period 2017-2020; Study Group 15, series wd11-10 International Telecommunication Union, Geneva, CH, vol. 11/15, pp. 1-5, Feb. 19, 2019.
ZTE Corporation, "Cell based OTN solution for G.Sup.sub1G", TU-T Draft; Study Period 2017-2020; Study Group 15, series C1852 International Telecommunication Union,Geneva, CH, vol. 11/15, pp. 1-6, Jan. 14, 2020.
International Search Report for the International Patent Application No. PCT/CN2020/072603, dated Apr. 9, 2020, 2 pages.

* cited by examiner

Configuration information traffic

OSU traffic 1

...

OSU traffic 100

Special idle block for rate justification

Overhead for storing the number of encoding blocks occupied by configuration information traffic

METHOD AND APPARATUS FOR TRANSMITTING CONFIGURATION INFORMATION, STORAGE MEDIUM, AND SYSTEM

CROSS-REFERENCE TO RELATED APPLICATIONS

This application claims priority to Chinese Patent Application No. 201910080760.0 filed with the CNIPA on Jan. 28, 2019, the disclosure of which is incorporated herein by reference in its entirety. This is a National Stage Application filed under 35 U.S.C. 371 based on International Patent Application No. PCT/CN2020/072603, filed on Jan. 17, 2020, which claims priority to Chinese Patent Application No. 201910080760.0 filed on Jan. 28, 2019, disclosures of both of which are incorporated herein by reference in their entireties.

TECHNICAL FIELD

Embodiments of the present disclosure relate to the field of communications, for example, a method and apparatus for transmitting configuration information, a storage medium and a system.

BACKGROUND

As important standards for optical transmission devices, optical transport network (OTN) standards are formula that ted by the International Telecommunication Union Telecommunication Standardization Sector (ITU-T). Almost all long-distance transmission networks are composed of devices that are based on OTN standards.

An OTN has standard signal formats, including an optical channel transport unit (OTU)k (k=1, 2, 3 and 4), a flexible optical transport network (Flexible OTN, FlexO) and a future-defined new OTN signal.

The preceding OTN signals are used for carrying various non-OTN signals or multiple low-rate optical channel data unit (ODU)i (i=1, 2, 2e, 3, 4 and flex) signals, and ODUi has a lower rate than ODUk. Hereinafter, low-rate ODUi (i<k) signals represent ODUi signals having a lower rate than ODUk signals. Non-OTN signals refer to various signals other than OTN signals, such as synchronous digital hierarchy (SDH) signals, Ethernet signals, fibre channel (FC) signals and various packet signals.

An OTN signal includes the overhead and the payload. Using OTUk as an example, FIG. 1 is a diagram of a relationship between an OTUk frame, an ODUk frame, an optical channel payload unit (OPU)k frame and OPUk payload. An OUTk signal is composed of OUTk frames. After OTUk overhead is removed from an OUTk frame, the remaining part that takes effect is referred to as the ODUk frame. After ODUk overhead is removed from the ODUk frame, the remaining part is referred to as the OPUk frame. After OPUk overhead is removed from the OPUk frame, the remaining part is referred to as OPUk payload. The OPUk payload is used for carrying one non-OTN signal or multiple low-rate ODUi (i<k) signals. A signal composed of ODUk frames is referred to as an ODUk signal.

In the definition of an OTN, a method for transferring multiple traffic signals is to divide the payload of the OTN signal into n slots and then package the traffic signals into one or more slots in the payload of the OTN signal. The slots are implemented by byte interpolation.

According to OTN standard G.709, the minimum slot granularity of OTN technology is 1.25 G. This slot granularity incurs serious bandwidth waste when traffic lower than 1.25 G (such as fast Ethernet (FE), synchronous transfer module-1 (STM-1) and E1) is carried. For example, the 2 M E1 signal packaged into a 1.25 G slot incurs a bandwidth waste of over 99%. Meanwhile, due to the large amount of an accessing client signal, after the client signal is mapped into a corresponding container, configuration information of the corresponding container (such as a container serial number) needs to be sent to a receiving side. The amount of configuration information is the same as the amount of client signals, and when the transport and distribution are performed in a traditional manner that is based on the overhead of the OTN frame, many OTN frames are required for completing the transmission, resulting in a longer transmission period and lower efficiency.

SUMMARY

Embodiments of the present disclosure provide a method and apparatus for transmitting configuration information, a storage medium and a system. These can improve the transmission efficiency of configuration information.

An embodiment of the present disclosure provides a method for transmitting configuration information. The method includes steps described below. A client signal is mapped into a predetermined container corresponding to the client signal. Configuration information of the predetermined container is encoded according to a predetermined format. The optical transport network frame that carries the predetermined container and the encoded configuration information of the predetermined container in the payload area is sent.

An embodiment of the present disclosure provides a method for transmitting configuration information. The method includes steps described below. An OTN frame is acquired. A payload area of the OTN frame carries a predetermined container and configuration information of the predetermined container. The configuration information and the predetermined container are acquired from the payload area of the OTN frame. A client signal is acquired from the predetermined container.

An embodiment of the present disclosure provides an apparatus for transmitting configuration information. The apparatus includes a mapping module and a sending module. The mapping module is configured to map a client signal into a predetermined container corresponding to the client signal. The sending module is configured to encode the configuration information of the predetermined container according to a predetermined format, and send the optical transport network frame that carries the predetermined container and the encoded configuration information of the predetermined container in the payload area.

An embodiment of the present disclosure provides an apparatus for transmitting configuration information. The apparatus includes a first acquisition module and a second acquisition module. The first acquisition module is configured to acquire an OTN frame. A payload area of the OTN frame carries a predetermined container and configuration information of the predetermined container. The second acquisition module is configured to acquire the configuration information and the predetermined container from the payload area of the OTN frame, and acquire a client signal from the predetermined container.

An embodiment of the present disclosure provides an apparatus for transmitting configuration information. The apparatus includes a processor and a computer-readable storage medium. The computer-readable storage medium stores instructions. When the instructions are executed by the processor, any method for transmitting configuration information described above is implemented.

An embodiment of the present disclosure provides a computer-readable storage medium. The computer-readable storage medium stores a computer program. The computer program, when executed by a processor, implements any method for transmitting configuration information described above.

An embodiment of the present disclosure provides a system for transmitting configuration information. The system includes a first node and a second node. The first node is configured to map a client signal into a predetermined container corresponding to the client signal, encode configuration information of the predetermined container according to a predetermined format, and send the optical transport network frame that carries the predetermined container and the encoded configuration information of the predetermined container in the payload area. The second node is configured to acquire an OTN frame, where a payload area of the OTN frame carries a predetermined container and configuration information of the predetermined container, acquire the configuration information and the predetermined container from the payload area of the OTN frame, and acquire a client signal from the predetermined container.

The embodiments of the present disclosure include that: a client signal is mapped into a predetermined container corresponding to the client signal, configuration information of the predetermined container is encoded according to a predetermined format, and the optical transport network frame that carries the predetermined container and the encoded configuration information of the predetermined container in the payload area is sent. According to the embodiments of the present disclosure, the configuration information is carried into the payload area of the OTN frame and sent, instead of being transmitted by using many OTN frames, thereby improving the transmission efficiency of the configuration information.

DETAILED DESCRIPTION

Embodiments of the present disclosure are described below in detail in conjunction to the drawings. It is to be noted that if not in collision, the embodiments and features therein in the present application may be combined with each other.

The steps illustrated in the flowcharts of the drawings may be performed by, for example, a computer system of a set of computer-executable instructions. Moreover, although logical sequences are illustrated in the flowcharts, the illustrated or described steps may be performed in sequences different from those illustrated herein in some cases.

Figure 1:
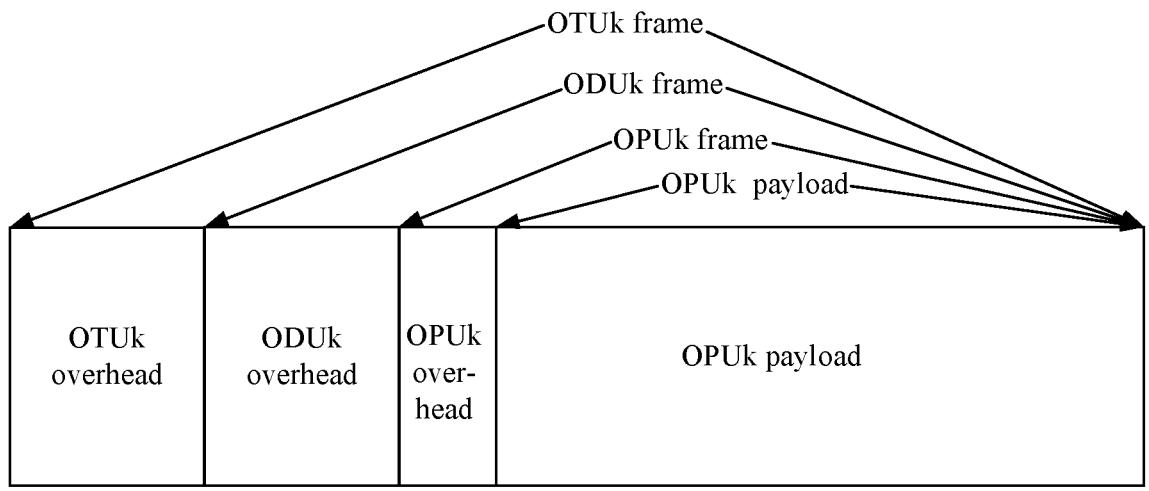
FIG. 1 is a diagram of a frame structure of OTUk in the related art.
Figure 2:
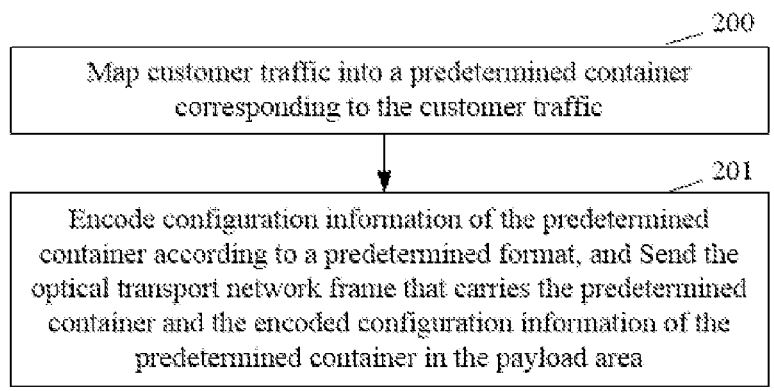
FIG. 2 is a flowchart of a method for transmitting configuration information according to an embodiment of the present disclosure.

Referring to FIG. 2, an embodiment of the present disclosure provides a method for transmitting configuration information. The method includes the steps described below.

In step 200, a client signal is mapped into a predetermined container corresponding to the client signal.

In an embodiment of the present disclosure, the predetermined container includes any one of an OSU or an ODU container.

In an embodiment of the present disclosure, the predetermined container includes N second encoding blocks. The second encoding blocks include an overhead encoding block (for detecting errors) and a payload encoding block.

The number of second encoding blocks in the predetermined container is obtained according to at least the following parameters: a bandwidth of the client signal, an encoding coefficient, a period of the predetermined container, the number of second encoding blocks contained in the predetermined container, and the length of the second encoding block.

Specifically, the number of second encoding blocks in the predetermined container may be calculated on the basis of the preceding parameters in any method. For example, the number of second encoding blocks in the predetermined container is calculated according to the formula that $$B' \times a \times T \times \frac{n}{n-m} = nL',$$

where B' denotes the bandwidth of the client signal, a denotes the encoding coefficient, T denotes the period of the predetermined container, m denotes the number of overhead encoding blocks in the second encoding blocks contained in the predetermined container, n denotes the number of second encoding blocks contained in the predetermined container, and L' denotes the length of the second encoding block.

Certainly, the number of second encoding blocks in the predetermined container may be calculated in other methods. Specific calculation methods are not intended to limit the scope of the embodiments of the present disclosure.

The second encoding block has a fixed length, such as 66b, 257b or 512b. Different encoding block types have different formats.

The overhead encoding block includes a synchronization header, frame header block type codes and other information (such as path monitoring information, protection switching information, multiframe indication information and a reserved byte).

The synchronization header is used for distinguishing whether an encoding block is the overhead encoding block or the payload encoding block. For example, 10 indicates the overhead encoding block and 01 indicates the payload encoding block. The frame header block type codes are used for frame synchronization processing.

The payload encoding block includes a synchronization header and carried data.

In an embodiment of the present disclosure, each client signal corresponds to a respective predetermined container. The predetermined container may be an optical service unit (OSU) and/or an optical data unit (ODU).

In an embodiment of the present disclosure, the step in which the client signal is mapped into the predetermined container corresponding to the client signal includes: the client signal is encoded or transcoded according to a predetermined encoding format, and the encoded or transcoded client signal is mapped into the predetermined container corresponding to the client signal according to bit synchronization mapping; or the client signal is directly mapped into the predetermined container corresponding to the client signal according to bit synchronization mapping.

For example, the client signal is mapped into the predetermined container corresponding to the client signal according to the bit synchronization mapping. For another example, the client signal is encoded according to the predetermined encoding format, and the encoded client signal is mapped into the predetermined container corresponding to the client signal according to the bit synchronous mapping. For example, X client signal bits are converted into of P bits of data blocks, that is, each X client signal bits are added with (P–X) bits of encoded information; in this case, the traffic rate after the encoding is equal to the client signal rate×(P/X), and the ratio of the predetermined container to payload encoding blocks in the predetermined container is r. For example, the predetermined container is composed of P bits of data blocks, and an overhead block is used as a frame header of the predetermined container and identified by a special type; in this case, the rate of the predetermined container is equal to the client signal rate×(P/X)×r. For another example, when the client signal is of a non-Ethernet type, the client signal is encoded according to the predetermined encoding format, and the encoded client signal is mapped into the predetermined container corresponding to the client signal according to the bit synchronous mapping; when the customer service is of an Ethernet type, the client signal is transcoded into the predetermined encoding format, and the transcoded client signal is mapped into the predetermined container corresponding to the client signal according to the bit synchronous mapping. For another example, when the client signal is of a non-Ethernet type, the client signal is encoded according to the predetermined encoding format, and the encoded client signal is mapped into the predetermined container corresponding to the client signal according to the bit synchronous mapping; when the client signal is of an Ethernet type, the client signal is mapped into the predetermined container corresponding to the client signal according to the bit synchronization mapping.

In step 201, the configuration information of the predetermined container is encoded according to a predetermined format, and the optical transport network frame that carries the predetermined container and the encoded configuration information of the predetermined container in the payload area is sent.

In an embodiment of the present disclosure, the step in which the configuration information of the predetermined container is encoded according to the predetermined format may be that all configuration information of all predetermined containers are encoded according to the predetermined format; or part of all configuration information of all predetermined containers are encoded independently, and an other part of configuration information of each predetermined container is encoded separately.

In an embodiment of the present disclosure, the configuration information of the predetermined container includes any one of the following: a serial number of the predetermined container, the number of first encoding blocks occupied by the predetermined container, or clock information of the predetermined container.

A part of the configuration information includes: the serial number of the predetermined container, and the number of first encoding blocks occupied by the predetermined container and the other part of the configuration information. The other part of the configuration information includes the clock information of the predetermined container.

In an embodiment of the present disclosure, the step in which the predetermined container and the configuration information of the predetermined container are carried into the payload area of the OTN frame and sent may be implemented in one of the methods described below.

In the methods described below, a first encoding block is an encoding block obtained by dividing the payload area of the OTN frame. The first encoding block has a fixed length, such as 66b, 257b or 512b, and different encoding block types have different formats.

In the division of the payload area of the OTN frame, if the length of the payload area of the OTN frame is not an integer multiple of the length of the first encoding block, then fixed bits are padded. For example, the size of the payload area of the OTN frame is 4×3808 bytes, that is, 121856 bits, which may be divided into L parts, where each part includes P bits of first encoding blocks and Q bits of padding. The bandwidth of each P bits of the first encoding blocks is equal to (P/121856)×the payload bandwidth of the OTN frame. The padding bits may be used to carry some overhead.

In the methods described below, a special encoding block has a specific format and thus may be distinguished from the overhead encoding block and the payload encoding block in the predetermined container. For example, the special encoding block includes at least one of the following: a special idle encoding block (such as an IDLE encoding block inserted with P bits), or an encoding block carrying the clock information of the predetermined container.

In the methods described below, the other part of the encoded configuration information has special encoding block type codes and may be distinguished from the overhead encoding block and the special idle encoding block of the predetermined container.

In method 1, when the part of the configuration information of the all predetermined containers are encoded according to the predetermined format, and the other part of the configuration information of each predetermined container is encoded according to the predetermined format, the number G3 of first encoding blocks required for the part of the encoded configuration information is determined, and the number G4 of first encoding blocks required for the predetermined container and the other part of the encoded configuration information is determined. The part of the encoded configuration information is carried into G3 first encoding blocks in the payload area of the OTN frame, and the predetermined container and the other part of the encoded configuration information are carried into G4 first encoding blocks in the payload area of the OTN frame. The special idle encoding block is inserted to adjust the rate during the carrying process. The number G3 of first encoding blocks occupied by the part of the encoded configuration information is stored in the overhead of the OTN frame and sent.

In method 1, the step in which the number G3 of first encoding blocks required for the part of the encoded configuration information is determined includes any one of the manners described below.

The bandwidth of the part of the encoded configuration information is determined, and the number G3 of first encoding blocks required by the part of the encoded configuration information is determined according to the bandwidth of the part of the encoded configuration information and the bandwidth of the first encoding block. The number G3 required for the part of the encoded configuration information is obtained according to at least the following parameters: the amount of client signals, the number of bits occupied by the serial number of the predetermined container which is in the configuration information, the number of bits occupied by the number of first encoding blocks occupied by the predetermined container and the other part of the encoded configuration information of the predetermined container which is in the configuration information, the number of frames of the OTN multiframe required for completing the transmission of the part of the configuration information, and the length of the first encoding block. Specifically, the number G3 of first encoding blocks required for the part of the encoded configuration information may be calculated on the basis of the preceding parameters in any method. For example, the number G3 required for the part of the encoded configuration information is calculated according to the formula that $$G3 = \left\lceil \frac{P(K_1 + K_4)}{F_1 L} \right\rceil,$$

where G3 denotes the number of first encoding blocks required by the part of the encoded configuration information, P denotes the amount of client signals, $K_1$ denotes the number of bits occupied by the serial number of the predetermined container which is in the configuration information, $K_4$ denotes the number of bits occupied by the number of first encoding blocks occupied by the predetermined container and the other part of the encoded configuration information which is in the configuration information, $F_1$ denotes the number of frames of the OTN multiframe required for completing the transmission of the part of the configuration information, and L denotes the length of the first encoding block. Certainly, the number G3 of first encoding blocks required for the part of the encoded configuration information may be calculated in other methods. Specific calculation methods are not intended to limit the scope of the embodiments of the present disclosure.

The step in which the bandwidth of the part of the encoded configuration information is determined includes that: the bandwidth of the part of the encoded configuration information is obtained according to at least the following parameters: the amount of client signals, the number of bits occupied by the serial number of the predetermined container, the number of bits occupied by the number of the first encoding block occupied by the predetermined container and the other part of the encoded configuration information, the number of frames of an OTN multiframe required for completing the transmission of the part of the configuration information, and a period of an OTN frame carrying the predetermined container.

Specifically, the bandwidth of the part of the encoded configuration information may be calculated on the basis of the preceding parameters in any method. For example, the bandwidth of the part of the encoded configuration information is calculated according to the formula that $$Q2 = \frac{P(K_1 + K_4)}{F_1 P_0},$$

where Q2 denotes the bandwidth of the part of the encoded configuration information, P denotes the amount of client signals, $K_1$ denotes the number of bits occupied by the serial number of the predetermined container, $K_4$ denotes the number of bits occupied by the number of first encoding blocks occupied by the predetermined container and the other part of the encoded configuration information, $F_1$ denotes the number of frames of the OTN multiframe required for completing the transmission of the part of the configuration information, and $P_0$ denotes the period of the OTN frame carrying the predetermined container.

Certainly, the bandwidth of the part of the encoded configuration information may be calculated in other methods. Specific calculation methods are not intended to limit the scope of the embodiments of the present disclosure.

Specifically, the number G3 of first encoding blocks required for the part of the encoded configuration information may be calculated on the basis of the preceding parameters in any method. For example, the step in which the number G3 of first encoding blocks required by the part of the encoded configuration information is determined according to the bandwidth of the part of the encoded configuration information and the bandwidth of the first encoding block includes that: the number G3 of first encoding blocks required for the part of the encoded configuration information is calculated according to the formula that $$G3 = \left\lceil \frac{Q2}{B} \right\rceil,$$

where G3 denotes the number of first encoding blocks required by the part of the encoded configuration information, Q2 denotes the bandwidth of the part of the encoded configuration information, and B denotes the bandwidth of the first encoding block.

Certainly, the number G3 of first encoding blocks required for the part of the encoded configuration information may be calculated in other methods. Specific calculation methods are not intended to limit the scope of the embodiments of the present disclosure.

In method 1, the step in which the number G4 of first encoding blocks required for the predetermined container and the other part of the encoded configuration information is determined includes that: the bandwidth of the predetermined container and the other part of the encoded configuration information is determined, and the number G4 of first encoding blocks required for the predetermined container and the other part of the encoded configuration information is determined according to the bandwidth of the first encoding block and the bandwidth of the predetermined container and the other part of the encoded configuration information.

The step in which the bandwidth of the predetermined container and the other part of the encoded configuration information is determined includes that: when the part of the configuration information includes a serial number of the client signal and the number of first encoding blocks occupied by the predetermined container and the other part of the encoded configuration information, and the other part of the configuration information includes the clock information of the predetermined container, the bandwidth of the predetermined container and the other part of the encoded configuration information is obtained according to at least the following parameters: the bandwidth of the predetermined container, an encoding coefficient, the amount of client signals, the number of bits occupied by the other part of the configuration information, the number of frames of the OTN multiframe required for completing the transmission of the other part of the configuration information, and the length of the first encoding block.

The bandwidth of the predetermined container and the other part of the encoded configuration information is calculated according to the formula that $$Q3 = Q4 + \frac{\alpha K_3}{F_2 L},$$

where Q3 denotes the bandwidth of the predetermined container and the other part of the encoded configuration information, Q4 denotes the bandwidth of the predetermined container, a denotes the encoding coefficient, P denotes the amount of client signals, K3 denotes the number of bits occupied by the other part of the configuration information, F2 denotes the number of frames of the OTN multiframe required for completing the transmission of the other part of the configuration information, L denotes the length of the first encoding block, and different client signals may have different $F_2$.

Certainly, the bandwidth of the predetermined container and the other part of the encoded configuration information may be calculated in other methods. Specific calculation methods are not intended to limit the scope of the embodiments of the present disclosure.

The number G4 of first encoding blocks required for the predetermined container and the other part of the encoded configuration information may be determined on the basis of the bandwidth of the first encoding block and the bandwidth of the predetermined container and the other part of the encoded configuration information in any method. For example, the step in which the number G4 of first encoding blocks required by the predetermined container and the other part of the encoded configuration information is determined according to the bandwidth of the first encoding block and the bandwidth of the predetermined container and the other part of the encoded configuration information includes that: the number G4 of first encoding blocks required for the predetermined container and the other part of the encoded configuration information is calculated according to the formula that $$G4 = \left\lceil \frac{Q3}{B} \right\rceil,$$

where G4 denotes the number of first encoding blocks required by the predetermined container and the other part of the encoded configuration information, Q3 denotes the bandwidth of the predetermined container and the other part of the encoded configuration information, and B denotes the bandwidth of the first encoding block.

Certainly, the number G4 of first encoding blocks required for the predetermined container and the other part of the encoded configuration information may be calculated in other modes. Specific calculation modes are not intended to limit the scope of the embodiments of the present disclosure.

In method 1, the step in which the part of the encoded configuration information is carried into the G3 first encoding blocks in the payload area of the OTN frame includes that: the positions of the G3 first encoding blocks in the payload area of the OTN frame are determined, and the part of the encoded configuration information is carried into the G3 first encoding blocks corresponding to the determined positions; the step in which the predetermined container and the other part of the encoded configuration information in are carried into the G4 first encoding blocks in the payload area of the OTN frame includes that: the positions of the G4 first encoding blocks in the payload area of the OTN frame are determined, and the predetermined container and the other part of the encoded configuration information are carried into G4 first encoding blocks corresponding to the determined positions; before the positions of first encoding blocks occupied by the all predetermined containers in the payload area of the OTN frame, the positions of the first encoding blocks occupied by the part of the encoded configuration information in the payload area of the OTN frame are firstly determined.

The step in which the positions of the G3 first encoding blocks in the payload area of the OTN frame are determined includes that: the positions of the G3 first encoding blocks in the payload area of the OTN frame are calculated according to a sigma-delta algorithm, or the positions of the G3 first encoding blocks in the payload area of the OTN frame are determined to be the first G3 first encoding blocks in the payload area of the OTN frame, or the positions of the G3 first encoding blocks in the payload area of the OTN frame are determined to be the last G3 first encoding blocks in the payload area of the OTN frame, or the positions of the G3 first encoding blocks in the payload area of the OTN frame are determined to be G3 first encoding blocks in other fixed positions in the payload area of the OTN frame.

The step in which the positions of the G4 first encoding blocks in the payload area of the OTN frame includes that: the positions of the G4 first encoding blocks among first encoding blocks other than the G3 first encoding blocks in the payload area are determined according to a sigma-delta algorithm. It is to be noted that to different predetermined containers may correspond to the same G4 or different G4.

For example, when different predetermined containers correspond to the same G4, the positions of G4 first encoding blocks corresponding to the first predetermined container among the (M−G3) first encoding blocks in the payload area of the OTN frame are determined according to the sigma-delta algorithm, the positions of G4 first encoding blocks corresponding to the second predetermined container among the (M−G3−G4) first encoding blocks in the payload area of the OTN frame are determined according to the sigma-delta algorithm, the positions of G4 first encoding blocks corresponding to the third predetermined container among the (M−G3−2*G4) first encoding blocks in the payload area of the OTN frame are determined according to the sigma-delta algorithm, and so on, until the positions of G4 first encoding blocks corresponding to all predetermined container are determined. M denotes the number of first encoding blocks that are included in the payload area of the OTN frame. When different predetermined containers correspond to different G4, the positions of the G4 first encoding blocks among the first encoding blocks other than the G3 first encoding blocks in the payload area may be determined in a similar manner.

The step in which the positions of the G4 first encoding blocks among the first encoding blocks other than the G3 first encoding blocks in the payload area are determined according to the sigma-delta algorithm includes that: predetermined containers are sorted, and the positions of G4 first encoding blocks corresponding to each predetermined container among the first encoding blocks other than the G3 first encoding blocks in the payload area are determined according to the sorting sequence by using the sigma-delta algorithm.

The predetermined containers may be sorted in any sorting method. For example, the sorting is performed according to the bandwidths of the predetermined containers and the encoded other part of configuration information from large to small. This sorting method is combined with the sigma-delta algorithm, thereby homogenizing the payload area of the OTN frame.

In method 1, when the encoded part of the configuration information of the all predetermined containers cannot fill the G3 first encoding blocks, padding information is inserted into the remaining positions in the G3 first encoding blocks. That is, there is the case where a part of one first encoding block is the part of the configuration information of the client signal and a part of the one first encoding block is the padding information.

In method 1, the step in which the part of the configuration information is encoded according to the predetermined format includes that: a part of configuration information are sorted, and the sorted part of the configuration information are encoded according to the predetermined format.

The part of the configuration information may be sorted according to any sequence. For example, the sorting is performed according to the bandwidths of the predetermined containers corresponding to the part of the configuration information from large to small.

Method 2: When the all configuration information of the all predetermined containers are encoded according to the predetermined format, the number G1 of first encoding blocks required for the encoded configuration information and the number G2 of first encoding blocks required by the predetermined container are determined. The encoded configuration information is carried into G1 first encoding blocks corresponding to a first predetermined position in the payload area of the OTN frame, and the predetermined container is carried into G2 first encoding blocks in the payload area of the OTN frame. The special encoding block is inserted during the mapping process to adjust the rate. The number G1 of first encoding blocks occupied by the encoded configuration information is stored in the overhead of the OTN frame and sent.

In method 2, the step in which the number G1 of first encoding blocks required for the encoded configuration information is determined includes any one of the manners described below. The bandwidth of the encoded configuration information is determined, and the number G1 of first encoding blocks required for the encoded configuration information is calculated according to the bandwidth of the encoded configuration information and the bandwidth of the first encoding block. The number G1 of first encoding blocks required for the encoded configuration information is obtained according to at least the following parameters: the amount of client signals, the number of bits occupied by the serial number of the predetermined container carrying the client signal which is in the configuration information, the number of bits occupied by the number of first encoding blocks occupied by the predetermined container which is in the configuration information, the number of bits occupied by the clock information of the predetermined container which is in the configuration information, the number of frames of the OTN multiframe required for completing the transmission of the configuration information of the predetermined container, and the length of the first encoding block. Specifically, the number G1 of first encoding blocks required for the encoded configuration information may be calculated on the basis of the preceding parameters in any method. For example, the number G1 of first encoding blocks required for the encoded configuration information is calculated according to the formula that $$G1 = \left\lceil \frac{P(K_1 + K_2 + K_3)}{F_3 L} \right\rceil,$$

where G1 denotes the number of first encoding blocks required by the encoded configuration information, P denotes the amount of client signals, $K_1$ denotes the number of bits occupied by the serial number of the predetermined container carrying the client signal which is in the configuration information, $K_2$ denotes the number of bits occupied by the number of first encoding blocks occupied by the predetermined container which is in the configuration information, $K_3$ denotes the number of bits occupied by the clock information of the predetermined container which is in the configuration information, $F_3$ denotes the number of frames of the OTN multiframe required for completing the transmission of the configuration information of the predetermined container, and L denotes the length of the first encoding block. Certainly, the number G1 of first encoding blocks required for the part of the encoded configuration information may be calculated in other methods. Specific calculation manners are not intended to limit the scope of the embodiments of the present disclosure.

The bandwidth of the encoded configuration information is obtained according to at least the following parameters: an encoding coefficient (that is, the ratio of the number of bits occupied by the encoded configuration information to the number of bits occupied by the configuration information before the encoding), the amount of client signals, the number of bits occupied by the serial number of the predetermined container which is in the configuration information, the number of bits occupied by the number of first encoding blocks occupied by the predetermined container which is in the configuration information, the number of bits occupied by the clock information of the predetermined container which is in the configuration information, the number of frames of the OTN multiframe required for completing the transmission of the configuration information of the predetermined container, and the period of the OTN frame carrying the predetermined container.

Specifically, the bandwidth of the encoded configuration information may be calculated on the basis of the preceding parameters in any method. For example, the step in which the bandwidth of the encoded configuration information is determined includes that: the bandwidth of the encoded configuration information is calculated according to the formula that $$Q1 = \frac{\alpha P(K_1 + K_2 + K_3)}{F_3 P_0},$$

where Q1 denotes the bandwidth of the encoded configuration information, a denotes the encoding coefficient (that is, the ratio of the number of bits occupied by the encoded configuration information to the number of bits occupied by the configuration information before the encoding), P denotes the amount of the client signal, K1 denotes the number of bits occupied by the serial number of the predetermined container which is in the configuration information, K2 denotes the number of bits occupied by the number of first encoding blocks occupied by the predetermined container which is in the configuration information, K3 denotes the number of bits occupied by the clock information of the predetermined container which is in the configuration information, F3 denotes the number of frames of the OTN multiframe required for completing the transmission of the configuration information of the predetermined container, and P0 denotes the period of the OTN frame carrying the predetermined container.

Certainly, the bandwidth of the encoded configuration information may be calculated in other methods. Specific calculation manners are not intended to limit the scope of the embodiments of the present disclosure.

Specifically, the number G1 of first encoding blocks required for the encoded configuration information may be calculated on the basis of the bandwidth of the encoded configuration information and the bandwidth of the first encoding block in any method. For example, the step in which the number G1 of first encoding blocks required the encoded configuration information is calculated according to the bandwidth of the encoded configuration information and the bandwidth of the first encoding block includes that: the number G1 of first encoding blocks required for the encoded configuration information is calculated according to the formula that $$G1 = \left\lceil \frac{Q1}{B} \right\rceil,$$

where G1 denotes the number of first encoding blocks required for the encoded configuration information, Q1 denotes the bandwidth of the encoded configuration information, and B denotes the bandwidth of the first encoding block.

Certainly, the number G1 of first encoding blocks required for the encoded configuration information may be calculated in other methods. Specific calculation methods are not intended to limit the scope of the embodiments of the present disclosure.

In method 2, the step in which the encoded configuration information is carried into the G1 first encoding blocks in the payload area of the OTN frame includes that: the positions of the G1 first encoding blocks in the payload area of the OTN frame are determined, and the encoded configuration information is carried into the G1 first encoding blocks corresponding to the determined positions; the step in which the predetermined container is carried into the G2 first encoding blocks in the payload area of the OTN frame includes that: the positions of the G2 first encoding blocks in the payload area of the OTN frame are determined, the predetermined container is carried into G2 first encoding blocks corresponding to the determined positions; before the positions of first encoding blocks occupied by the all predetermined containers in the payload area of the OTN frame are determined, the positions of first encoding blocks occupied by the configuration information in the payload area of the OTN frame are firstly determined.

The step in which the positions of the G1 first encoding blocks in the payload area of the OTN frame are determined includes that: the positions of the G1 first encoding blocks in the payload area of the OTN frame are calculated according to a sigma-delta algorithm, or the positions of the G1 first encoding blocks in the payload area of the OTN frame are determined to be the first G1 first encoding blocks in the payload area of the OTN frame, or the positions of the G1 first encoding blocks in the payload area of the OTN frame are determined to be the last G1 first encoding blocks in the payload area of the OTN frame, or the positions of the G1 first encoding blocks in the payload area of the OTN frame are determined to be G1 first encoding blocks in other fixed positions in the payload area of the OTN frame.

The step in which the positions of the G2 first encoding blocks in the payload area of the OTN frame are determined includes that: the positions of the G2 first encoding blocks among first encoding blocks other than the G1 first encoding blocks in the payload area of the OTN frame are determined according to the sigma-delta algorithm, and the predetermined container is carried into G2 first encoding blocks corresponding to the determined positions.

The step in which the positions of the G2 first encoding blocks among the first encoding blocks other than the G1 first encoding blocks in the payload area of the OTN frame are determined according to the sigma-delta algorithm includes that: the predetermined containers are sorted, and the positions of the G2 first encoding blocks among the first encoding blocks other than the G1 first encoding blocks in the payload area of the OTN frame are determined according to the sorting sequence by using the sigma-delta algorithm. It is to be noted that different predetermined containers may correspond to the same G2 or different G2. For example, when different predetermined containers correspond to the same G2, the positions of the G2 first encoding blocks corresponding to the first predetermined container among the (M−G1) first encoding blocks in the payload area of the OTN frame are determined according to the sigma-delta algorithm, the positions of G2 first encoding blocks corresponding to the second predetermined container among the (M−G1−G2) first encoding blocks in the payload area of the OTN frame are determined according to the sigma-delta algorithm, the positions of G2 first encoding blocks corresponding to the third predetermined container among the (M−G1−2*G2) first encoding blocks in the payload area of the OTN frame are determined according to the sigma-delta algorithm, and so on, until the positions of G2 first encoding blocks corresponding to each predetermined container are determined. M denotes the number of first encoding blocks included in the payload area of the OTN frame. When different predetermined containers correspond to different G2, the positions of the G2 first encoding blocks among the first encoding blocks other than the G1 first encoding blocks in the payload area may be determined in a similar manner.

The sorting may be performed in any sorting method. For example, the sorting is performed according to the bandwidths of the predetermined containers from large to small. This sorting method is combined with the sigma-delta algorithm, thereby homogenizing the payload area of the OTN frame.

In method 2, when encoded configuration information of the all predetermined containers cannot fill the G1 first encoding blocks, padding information is inserted into the remaining positions in the G1 first encoding blocks.

In method 2, the step in which the configuration information of the predetermined container is encoded according to the predetermined format includes that: configuration information are sorted, and the sorted configuration information are encoded according to the predetermined format.

The configuration information may be sorted according to any sorting sequence. For example, the sorting is performed according to the bandwidths of predetermined containers corresponding to the configuration information from large to small.

In an embodiment of the present disclosure, the OTN frame may be mapped into a higher order container and sent out via a corresponding interface. The high order container may be a high order ODUk (HO ODUk). The interface may be OTUk or FlexO.

According to the embodiments of the present disclosure, the configuration information is carried in the payload area of the OTN frame and sent, instead of being transmitted by using many OTN frames, thereby improving the transmission efficiency of the configuration information.

Figure 3:
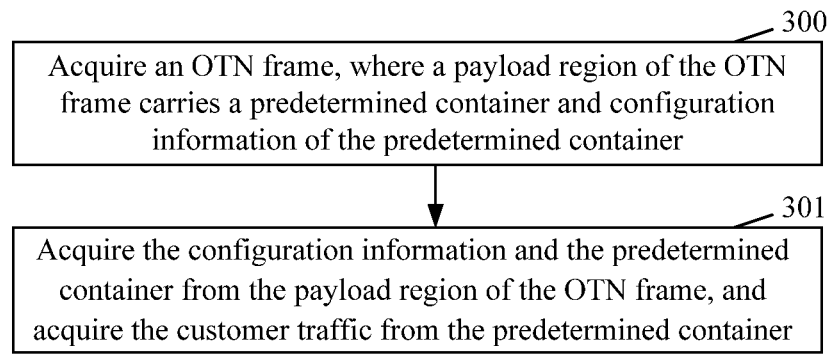
FIG. 3 is a flowchart of a method for transmitting configuration information according to another embodiment of the present disclosure.

Referring to FIG. 3, another embodiment of the present disclosure provides a method for transmitting configuration information. The method includes step 300: an OTN frame is acquired. A payload area of the OTN frame carries a predetermined container and configuration information of the predetermined container.

In an embodiment of the present disclosure, a high order container is received from a corresponding interface, and the high-order container is demapped to obtain the OTN frame.

In an embodiment of the present disclosure, the configuration information of the predetermined container includes any one of the following: a serial number of a client signal, the number of first encoding blocks occupied by the predetermined container, or clock information of the predetermined container.

A part of the configuration information includes: the serial number of the client signal, and the number of first encoding blocks occupied by the predetermined container and an other part of the configuration information. The other part of the configuration information includes the clock information of the predetermined container.

In step 301, the configuration information and the predetermined container are acquired from the payload area of the OTN frame, and the client signal is acquired from the predetermined container.

In an embodiment of the present disclosure, the step in which the configuration information and the predetermined container are acquired from the payload area of the OTN frame includes that: the part of the configuration information is acquired from the payload area of the OTN frame, and the predetermined container and the other part of the configuration information are acquired from the payload area of the OTN frame according to the part of the configuration information; or the configuration information is acquired from the payload area of the OTN frame, and the predetermined container is acquired from the payload area of the OTN frame according to the configuration information.

The step in which the part of the configuration information is acquired from the payload area of the OTN frame includes that: the number G3 of first encoding blocks occupied by the part of the encoded configuration information is acquired from the overhead of the OTN frame, the positions of G3 first encoding blocks in the payload area of the OTN frame are acquired, and the G3 first encoding blocks are extracted from the determined positions in the payload area of the OTN frame, and a data stream in the G3 first encoding blocks is decoded to obtain the configuration information. Alternatively, the step in which the configuration information is acquired from the payload area of the OTN frame includes that: the number G1 of first encoding blocks occupied by the encoded configuration information is acquired from the overhead of the OTN frame, the positions of G1 first encoding blocks in the payload area of the OTN frame are determined, the G1 first encoding blocks are extracted from the determined positions in the payload area of the OTN frame, and a data stream in the G1 first encoding blocks is decoded to obtain the configuration information. A first encoding block is an encoding block obtained by dividing the payload area of the OTN frame.

The step in which the positions of the G3 first encoding blocks in the payload area of the OTN frame are determined includes that: the positions of the G3 first encoding blocks in the payload of the OTN frame are determined according to a sigma-delta algorithm, or the positions of the G3 first encoding blocks in the payload area of the OTN frame are determined to be the first G3 first encoding blocks in the payload area of the OTN frame, or the positions of the G3 first encoding blocks in the payload area of the OTN frame are determined to be the last G3 first encoding blocks in the payload area of the OTN frame.

The step in which the positions of the G1 first encoding blocks in the payload area of the OTN frame are determined includes that: the positions of the G1 first encoding blocks in the payload of the OTN frame are determined according to a sigma-delta algorithm, or the positions of the G1 first encoding blocks in the payload area of the OTN frame are determined to be the first G1 first encoding blocks in the payload area of the OTN frame, or the positions of the G1 first encoding blocks in the payload area of the OTN frame are determined to be the last G1 first encoding blocks in the payload area of the OTN frame.

The step in which the predetermined container is acquired from the payload area of the OTN frame according to the configuration information includes that: the number G2 of first encoding blocks occupied by the predetermined container is acquired according to the configuration information of the predetermined container; the positions of the G2 first encoding blocks occupied by the predetermined container in the payload area of the OTN frame are acquired according to the sigma-delta algorithm. Specifically, the positions of the G2 first encoding blocks occupied by the predetermined container in the payload area of the OTN frame are determined according to the sorting sequence at a sending end by using the sigma-delta algorithm; the traffic data stream is extracted from G2 first encoding blocks corresponding to the determined positions in the payload area of the OTN frame;

and a special encoding block in the traffic data stream is identified and deleted to obtain the predetermined container.

In an embodiment of the present disclosure, the step in which the client signal is acquired from the predetermined container includes that: frame synchronization processing is performed on the predetermined container, and the client signal is acquired from the payload of the predetermined container.

The step in which the client signal is acquired from the payload of the predetermined container includes that: the client signal data stream is acquired from the payload of the predetermined container to directly obtain the client signal, or the client signal data stream is extracted from the payload of the predetermined container, and the client signal data stream is decoded or transcoded according to a predetermined encoding format to obtain the client signal.

For example, the client signal data stream is extracted from the payload of the predetermined container to directly obtain the client signal. For another example, the client signal data stream is extracted from the payload of the predetermined container, and the client signal data stream is decoded or transcoded according to the predetermined encoding format to obtain the client signal. For another example, when the client signal is of a non-Ethernet type, the client signal data stream is extracted from the payload of the predetermined container, and the client signal data stream is decoded according to the predetermined encoding format to obtain the client signal; when the client signal is of an Ethernet type, the client signal data stream is extracted from the payload of the predetermined container, and the client signal data stream is transcoded according to the predetermined encoding format to obtain the client signal. For another example, when the client signal is of a non-Ethernet type, the client signal data stream is extracted from the payload of the predetermined container, and the client signal data stream is decoded according to the predetermined encoding format to obtain the client signal; when the client signal is of an Ethernet type, the client signal data stream is extracted from the payload of the predetermined container to directly obtain the client signal.

The embodiments of the present disclosure are described in detail below by way of specific examples. The listed examples are not intended to limit the scope of the embodiments of the present disclosure, which are not repeated here.

Example 1

Figure 4:
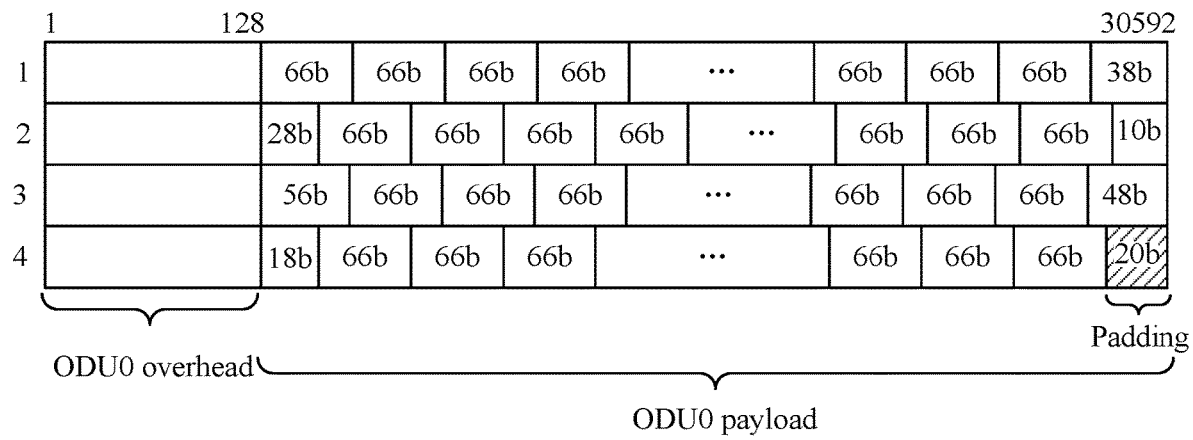
FIG. 4 is a diagram illustrating that a payload area of ODU0 are divided into 66b blocks according to an embodiment of the present disclosure.

In this example, 100 virtual container 12 (VC12) signals with a 2.24 Mbit/s bandwidth are transported between two OTN devices through OTU2, and a traditional ODU0 payload area is divided into 1846 66b blocks (that is, first encoding blocks), where 20 bits are used as padding, which is located at the end of the payload area, as shown in FIG. 4.

In step 1, at a sending end, 64b/66b encoding is performed on each VC12 signal, and the rate after the encoding is such that 2.24 Mbits/s*66/64=2.31 Mbit/s.

In step 2, the encoded VC12 signal is mapped into an OSU through a bit-synchronous mapping procedure (BMP). The OSU is composed of 18 66b blocks (that is, second encoding blocks). The first 66b block is an overhead encoding block, and the frame header is identified by a synchronization header of 10 and block type codes of 0x78. The bandwidth of the OSU is 2.31 Mbit/s*18/17 (=2.446 Mbit/s). The formula that B' *66/64*T*n/(n−1)=n*66 is solved, obtaining that n=18, where B' denotes the bandwidth of VC12, and T denotes the period of the OSU (that is, 500 us).

In step 3, in ODU0, the bandwidth of each 66b block is such that 1.24416 Gbit/s*66/(4*3824*8)=0.671 Mbit/s, where 1.24416 Gbit/s is the bandwidth of ODU0, and 4*3824*8 is the number of bits in a ODU0 frame.

Figure 5:
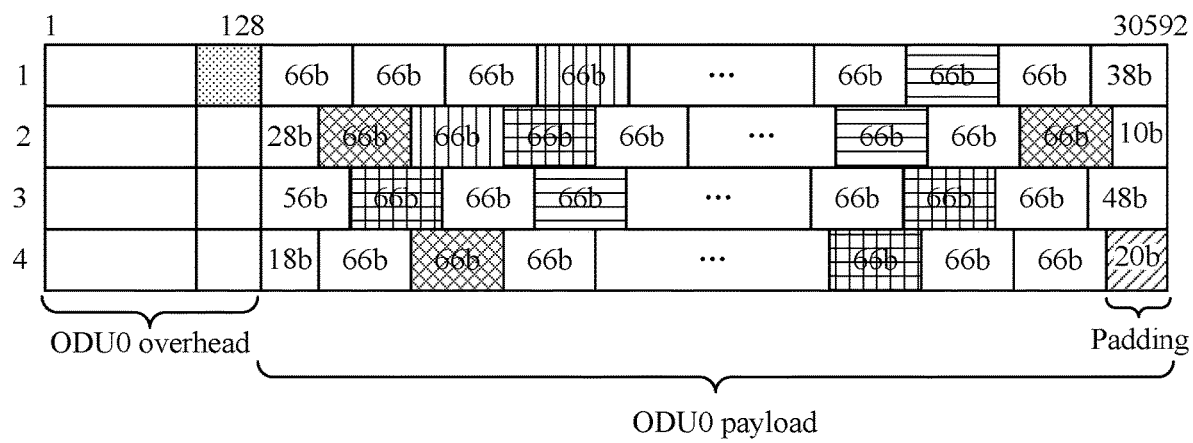
FIG. 5 is a storage diagram of configuration information and OTN service units (OSUs) in ODU0 according to example 1 of an embodiment of the present disclosure.
Figure 5:
Figure 5:
Figure 5:
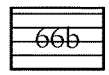
Figure 5:
Figure 5:

In step 4, to complete the transmission of serial numbers of the OSU (a total of 1846 first encoding block and a maximum of 1846 serial numbers, using 11 bits), the number of first encoding blocks occupied by the OSU (a total of 1846 first encoding blocks, and each OSU occupying a maximum of 1846 encoding blocks, using 11 bits) and clock information (reusing 6 justification control (JC) bytes of a generic mapping procedure (GMP), using 48 bits) within 1 ms (for a protection switching required time of 50 ms, a configuration information transmission period of 1 ms is appropriate), the bandwidth is calculated such that: 100*70 bit/1 ms=7 Mbit/s; and the encoding is performed according to an overhead ratio of 1.04 times (after the 64b/66b encoding, the bandwidth is increased by 1.0315 times, and added with some frame header identification information, the rate is increased by about 1.04 times), the bandwidth is 7.28 Mbit/s after the encoding, occupying 11 first encoding blocks, and this number (11) is used as the overhead and stored in OPU0 overhead. According to the relationship between the bandwidth of the OSU and the bandwidth of each 66b block in ODU0, it may be known that each OSU occupies 4 66b blocks. The positions of 11 66b blocks occupied by the configuration information of the client signal among the 1846 66b blocks in ODU0 are calculated according to the sigma-delta algorithm. Then, the positions of 4 66b blocks occupied by the first OSU in the ODU0 among the (1846−11) 66b blocks are calculated. Similarly, the positions of 4 66b blocks occupied by the second OSU in the ODU0 among the (1846−11−4) 66b blocks are calculated, and the positions of 4 66b blocks occupied by the third OSU in the ODU0 among the (1846−11−4*2) 66b blocks are calculated, until the storage of the 100th OSU is completed, as shown in FIG. 5.

In step 5, ODU0 is mapped into a slot of ODU2, then mapped into OTU2, and sent out via an interface.

In step 6, at a receiving end, demapping is performed on OTU2 to obtain ODU0, and the number (11) of 66b blocks occupied by the configuration information of the OSU is extracted from OPU0 overhead of ODU0, the positions of 11 66b blocks are acquired according to the sigma-delta algorithm to extract the configuration information; according to the configuration information, respective data streams are extracted from 66b blocks corresponding to the positions in the ODU0 payload area, and an idle block in the data streams are identified and deleted, obtaining the OSU.

In step 7, frame synchronization is performed on the OSU, then demapping is performed on the OSU to acquire an encoded data stream, and finally, decoding is performed to acquire a VC12 signal.

Example 2

Figure 6:
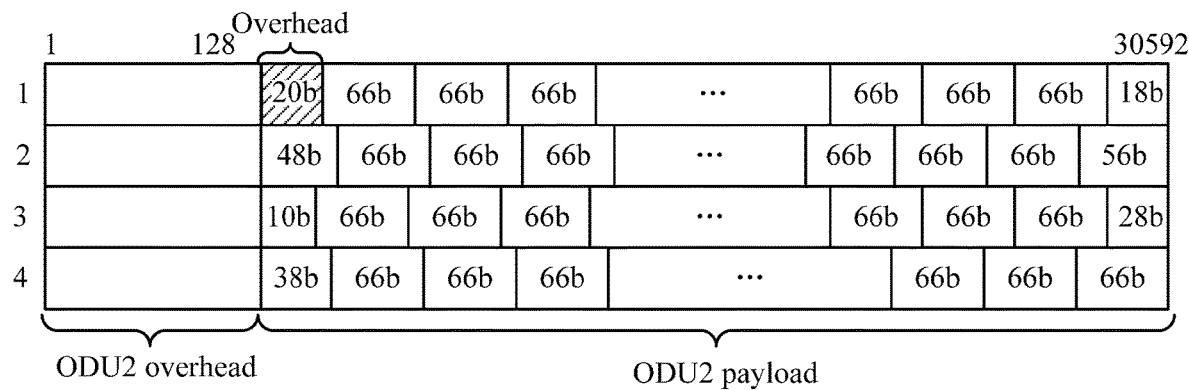
FIG. 6 is a diagram illustrating that a payload area of ODU0 are divided into 66b blocks according to an embodiment of the present disclosure.

In this example, 50 VC4 signals with a 150.336 Mbit/s bandwidth are transported between two OTN devices through OTU4. A traditional ODU2 payload area is divided into 1846 66b blocks, where 20 bits are used as the overhead, which is located at the start of the payload area, as shown in FIG. 6.

In step 1, at a sending end, 64b/66b encoding is performed on each VC4 signal, and the rate after the encoding is such that 150.336 Mbits/s*66/64=155.034 Mbit/s.

In step 2, the encoded VC4 signal is mapped into an OSU through a BMP. The OSU is composed of 295 66b blocks. The first 66b block is the overhead, and a frame header is identified by a synchronization header of 10 and block type codes of 0x78. The bandwidth of the OSU is such that 155.034 Mbit/s*295/294=155.562 Mbit/s. The formula that that B' *66/64*T*n/(n−1)=n*66 is solved, obtaining that n=295, where B' denotes the bandwidth of VC4, and T denotes the period of the OSU (that is, 500 us).

In step 3, in ODU2, the bandwidth of each 66b block is such that 10.037273924 Gbit/s*66/(4*3824*8)=5.413 Mbit/s, where 10.037273924 Gbit/s is the bandwidth of ODU2, and 4*3824*8 is the number of bits in a ODU2 frame.

In step 4, to complete the transmission of serial numbers of the OSU (a total of 1846 first encoding blocks and a maximum of 1846 serial numbers, using 11 bits) and the number of first encoding blocks occupied by the OSU (a total of 1846 first encoding blocks, and each OSU occupying a maximum of 1846 encoding blocks, using 11 bits) within 1 ms (for a protection switching required time of 50 ms, a configuration information transmission period of 1 ms is appropriate), the bandwidth is calculated such that: 50*22 bit/1 ms=1.1 Mbit/s; the encoding is performed according to an overhead ratio of 1.04 times (after the 64b/66b encoding, the bandwidth is increased by 1.0315 times, and in added with some frame header identification information, the rate is increased by about 1.04 times), the bandwidth is 1.144 Mbit/s after the encoding, occupying 1 first encoding block, and this number is used as the overhead and stored in OPU0 overhead. To complete clock information of the OSU (reusing 6 JC bytes of a GMP, using 48 bits) within 5 ms, the bandwidth is calculated such that 1*48 bit/0.5 ms=96 kbit/s, the bandwidth is such that 96 kbit/s*66/48=0.132 Mbit/s after the encoding into a 66b block, where the 66b block is a special 66bb block with a synchronization header of 10 and a control block type of 0x4B, and 155.562 Mbit/s+0.132 Mbit/s=155.694 Mbit/s. According to the relationship between the bandwidth of the OSU and the bandwidth of each 66b block in ODU2, it may be known that each OSU occupies 29 66b blocks.

Figure 7:
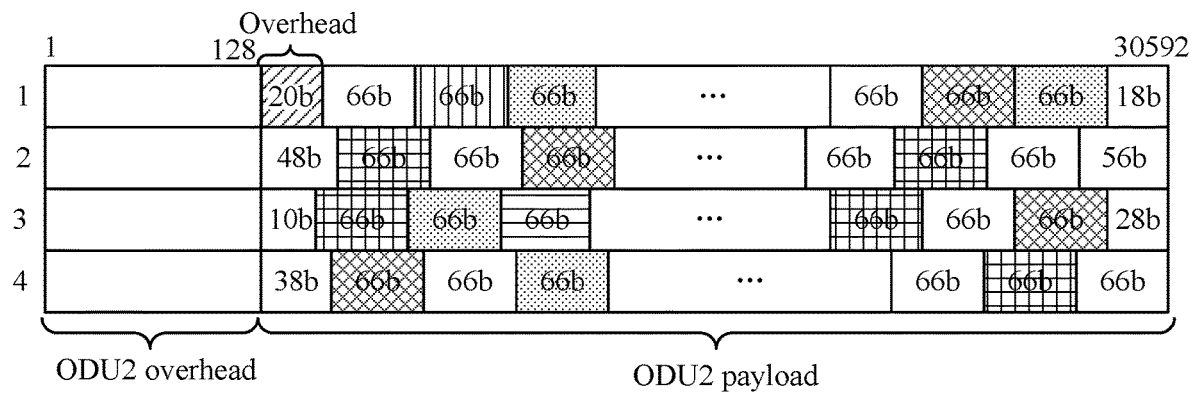
FIG. 7 is a storage diagram of configuration information and OSUs in ODU2 according to example 2 of an embodiment of the present disclosure.

The position of one 66b block occupied by the configuration information of the client signal among the 1846 66b blocks in ODU2 is calculated according to the sigma-delta algorithm. Then, the positions of 29 66b blocks occupied by the first OSU in ODU2 among the (1846−1) 66b blocks are calculated according to the sigma-delta algorithm. Similarly, the positions of 29 66b blocks occupied by the second OSU in ODU0 which are the (1846−1−29) 66b blocks are calculated, until the storage of the 50th OSU is completed. The situation after the storage is as shown in FIG. 7.

In step 5, ODU2 is mapped into ODU4, then mapped into OTU4, and sent out via an interface.

In step 6, at a receiving end, demapping is performed on OTU4 to obtain ODU2, and the number (1) of first encoding blocks occupied by the configuration information of the client signal is extracted from a payload area of ODU2; the position of one encoding block is acquired according to the sigma-delta algorithm to extract the configuration information; according to the configuration information, a data stream is extracted from the 66b block corresponding to the position, an idle block in the data stream is identified and deleted, an encoding block of the clock information is identified to acquire the clock information, and then, the encoding block is deleted, obtaining the OSU.

In step 7, frame synchronization is performed on the OSU, then demapping is performed on the OSU to acquire an encoded data stream, and finally, decoding is performed to obtain a VC4 signal.

Example 3

In this example, 1000 VC12 signals with a 2.24 Mbit/s bandwidth are transported between two OTN devices through OTU2. A traditional ODU0 payload area is divided into 1846 66b blocks, where 20 bits are used as padding, which is located at the end of the payload area, as shown in FIG. 4.

In step 1, at a sending end, 64b/66b encoding is performed on each VC12 signal, and the rate after the encoding is such that 2.24 Mbits/s*66/64=2.31 Mbit/s.

In step 2, the encoded VC12 signal is mapped into an OSU through a BMP. The OSU is composed of 18 66b blocks. The first 66b block is the overhead, and the frame header is identified by a synchronization header of 10 and block type codes of 0x78. The bandwidth of the OSU is such that 2.31 Mbit/s*18/17=2.446 Mbit/s. The formula that that B' *66/64*T*n/(n−1)=n*66 is solved, obtaining that n=18, where B' denotes the bandwidth of VC12, and T denotes the period of the OSU (that is, 500 us).

In step 3, in ODU0, the bandwidth of each 66b block is such that 1.24416 Gbit/s*66/(4*3824*8)=0.671 Mbit/s, where 1.24416 Gbit/s is the bandwidth of ODU0, and 4*3824*8 is the number of bits in a ODU0 frame.

Figure 8:
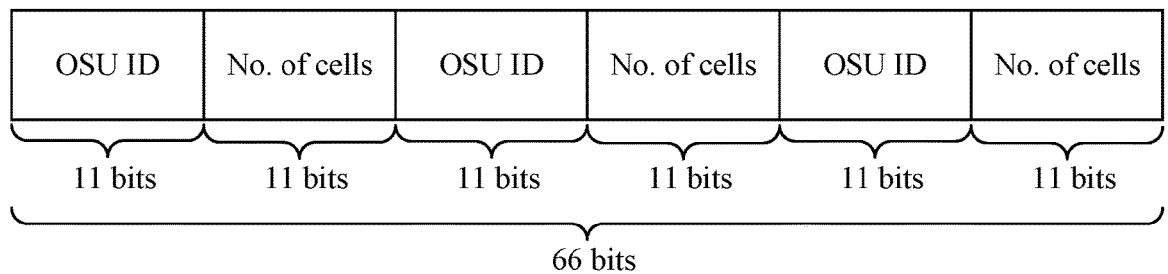
FIG. 8 is a storage diagram of configuration information of three OSUs (each piece of configuration information includes a serial number and the number of occupied encoding blocks) in a 66-bit encoding block according to an embodiment of the present disclosure.
Figure 9:
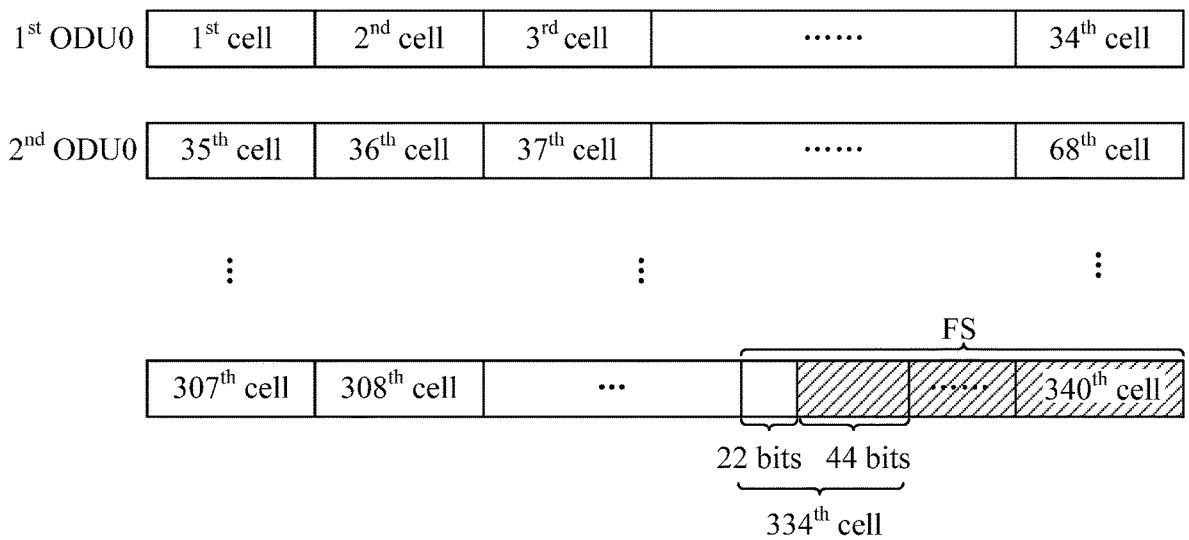
FIG. 9 is a storage diagram of configuration information of 1000 OSUs (each piece of configuration information includes a serial number and the number of occupied encoding blocks) in 340 encoding blocks of 10 ODU0 frames according to example 3 of an embodiment of the present disclosure.

In step 4, to complete serial numbers of the OSU (a total of 1846 first encoding blocks and a maximum of 1846 serial numbers, using 11 bits) and the number of first encoding blocks occupied by the OSU (a total of 1846 first encoding blocks, and each OSU occupying a maximum of 1846 first encoding blocks, using 11 bits) within 10 ODU0 frame periods (about 1 ms, and for a protection switching required time of 50 ms, a configuration information transmission period of 1 ms is appropriate), a calculation is performed such that 1000*22/10*66, rounding up to 34. That is, the configuration information occupies 34 first encoding blocks in each ODU0 frame. Each first encoding block has 66 bits and may carry configuration information of three OSUs (each piece of configuration information occupies 22 bits (11+11=22 bits). As shown in FIG. 8, an OSU identifier (ID) is a serial number of a client signal, and No. of cells is the number of first encoding blocks occupied by the OSU. A total of 34*10 first encoding blocks carry configuration information of 1000 OSUs. First 333 66b encoding blocks carry configuration information of first 999 OSUs. First 22 bits of a 334th 66b encoding block carry configuration information of the 1000th OSU. The last 44 bits of the 334th 66b encoding block and the last 6 (340−334=6) 66b encoding blocks are all padding, as shown in FIG. 9.

In step 5, to complete the transmission of clock information of each OSU within 1 ms, the clock information of each OSU uses 48 bits (reusing 6 JC bytes of a GMP) and is encoded into a 66b block, and the bandwidth is such that 66 bit/1 ms=0.066 Mbit/s; added with the bandwidth of the OSU, the bandwidth is such that 2.446 Mbit/s+0.066 Mbit/s=2.512 Mbit/s; 2.512 Mbit/s/0.671 Mbit/s≈4. That is, OSU traffic added with the clock information occupies 4 66b encoding blocks.

Figure 10:
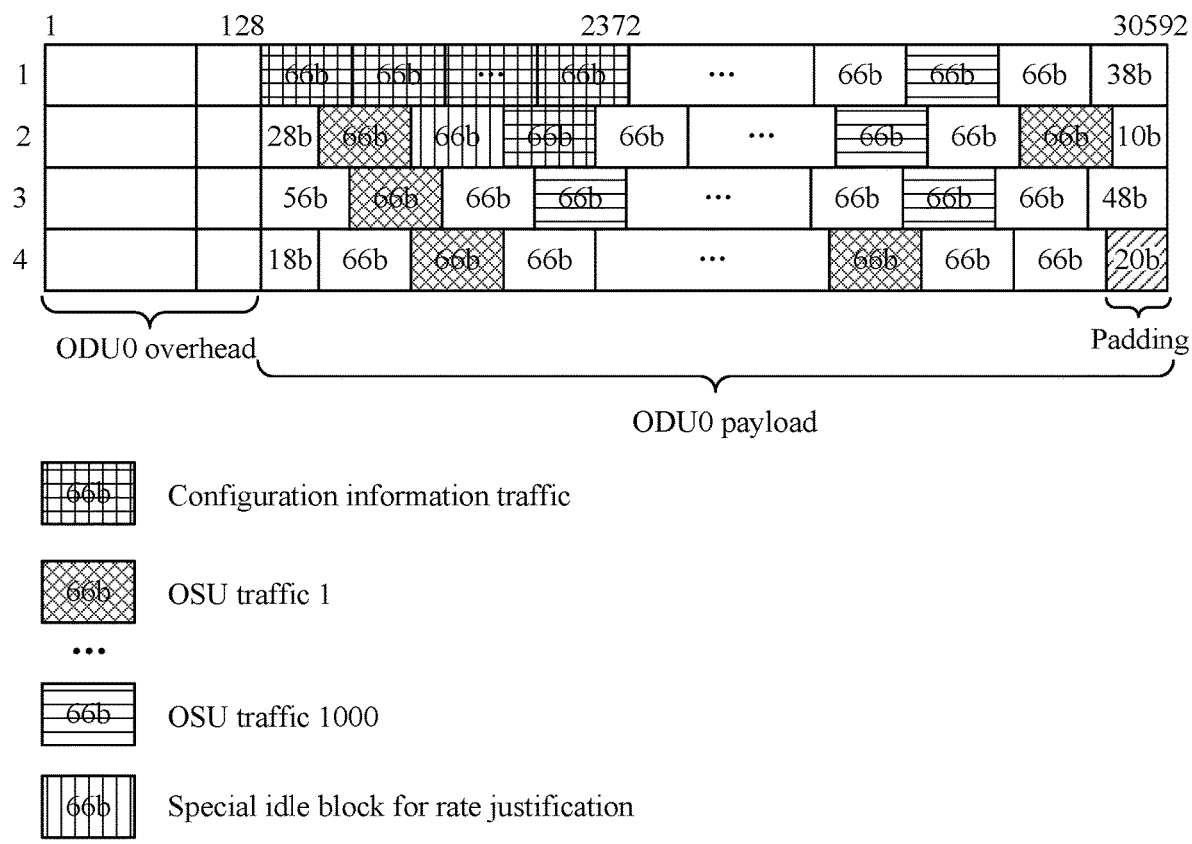
FIG. 10 is a storage diagram of configuration information and OSUs in ODU2 according to example 4 of an embodiment of the present disclosure.

In step 6, the configuration information of the 1000 OSUs is transferred in first 34 encoding blocks of ODU0, and the positions of 4 66b blocks occupied by the first OSU among the (1846−34) 66b blocks in ODU0 are calculated according to a sigma-delta algorithm; similarly, the positions of 4 66b blocks occupied by the second OSU in ODU0 among the (1846−34−4) 66b blocks are calculated, and the positions of 4 66b blocks occupied by the third OSU in ODU0 among the (1846−34−4*2) 66b blocks are calculated, until the storage of the 1000th OSU is completed. The situation after the storage is as shown in FIG. 10.

In step 5, ODU0 is mapped into a slot of ODU2, then mapped into OTU2, and sent out via an interface.

In step 6, at a receiving end, demapping is performed on ODU0 to obtain OTU2, and configuration information of the 1000 OSUs are extracted from the first 34 66b encoding blocks in OPU0 payload of 10 ODU0 frames; according to the configuration information, respective data streams are extracted from 66b blocks corresponding to the positions in a ODU0 payload area, an idle block in the data streams is identified and deleted, obtaining the OSU.

In step 7, frame synchronization is performed on the OSU, then demapping is performed on the OSU to acquire an encoded data stream, and finally, decoding is performed to acquire a VC12 signal.

Figure 11:
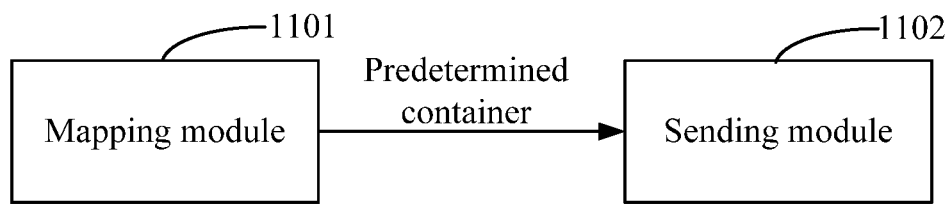
FIG. 11 is a structural diagram of an apparatus for transmitting configuration information according to another embodiment of the present disclosure.

Referring to FIG. 11, another embodiment of the present disclosure provides an apparatus for transmitting configuration information. The apparatus includes a mapping module 1101 and a sending module 1102. The mapping module 1101 is configured to map a client signal to a predetermined container corresponding to the client signal. The sending module 1102 is configured to encode configuration information of the predetermined container according to a predetermined format, and carry a first predetermined container and the encoded configuration information of the predetermined container into a payload area of an OTN frame to send.

In an embodiment of the present disclosure, the predetermined container includes any one of the following: an OSU container or an ODU container.

In an embodiment of the present disclosure, the predetermined container includes N second encoding blocks. The second encoding blocks includes an overhead encoding block (for detecting errors) and a payload encoding block.

The number of second encoding blocks in the predetermined container is obtained according to at least the following parameters: the bandwidth of the client signal, an encoding coefficient, a period of the predetermined container, the number of second encoding blocks contained in the predetermined container, and the length of a second encoding block.

Specifically, the number of second encoding blocks in the predetermined container may be calculated on the basis of the preceding parameters in any method. For example, the number of second encoding blocks in the predetermined container is calculated according to the formula that $$B' \times a \times T \times \frac{n}{n-m} = nL',$$

where B' denotes the bandwidth of the client signal, a denotes the encoding coefficient, T denotes the period of the predetermined container, m denotes the number of overhead encoding blocks in the second encoding blocks contained in the predetermined container, n denotes the number of second encoding blocks contained in the predetermined container, and L' denotes the length of the second encoding block.

Certainly, the number of second encoding blocks in the predetermined container may be calculated in other methods. Specific calculation methods are not intended to limit the scope of the embodiments of the present disclosure.

The second encoding block has a fixed length, such as 66b, 257b or 512b. Different encoding block types have different formats.

The overhead encoding block includes: a synchronization header, frame header block type codes and other information (such as path monitoring information, protection switching information, multiframe indication information and a reserved byte).

The synchronization header is used for distinguishing whether an encoding block is the overhead encoding block or the payload encoding block. The frame header block type codes are used for frame synchronization processing.

The payload encoding block includes a synchronization header and carried data.

In an embodiment of the present disclosure, each client signal corresponds to a respective predetermined container.

In an embodiment of the present disclosure, the mapping module 1101 is specifically configured to map the client signal into the predetermined container corresponding to the client signal such that: encode or transcode the client signal according to a predetermined encoding format, and map the encoded or transcoded client signal into the predetermined container corresponding to the client signal according to bit synchronization mapping; or directly map the client signal into the predetermined container corresponding to the client signal according to bit synchronization mapping. For example, the client signal is mapped into the predetermined container corresponding to the client signal according to the bit synchronization mapping. For another example, the client signal is encoded according to the predetermined encoding format, and the encoded client signal is mapped into the predetermined container corresponding to the client signal according to the bit synchronous mapping. For example, X client signal bits are converted into P bits of data blocks, that is, each X client signal bits are added with (P−X) bits of encoded information; in this case, the traffic rate after the encoding is equal to the client signal rate×(P/X); the ratio of the predetermined container to the payload encoding blocks in the predetermined container is r. For example, the predetermined container is composed of P bits of data blocks, an overhead block is used as a frame header of the predetermined container and identified by a special type; in this case, the rate of the predetermined container is equal to the client signal rate×(P/X)×r. For another example, when the client signal is of a non-Ethernet type, the client signal is encoded according to a predetermined encoding format, and the encoded client signal is mapped into the predetermined container corresponding to the client signal according to bit synchronous mapping; when the client signal is of an Ethernet type, the client signal is transcoded into the predetermined encoding format, and the transcoded client signal is mapped into the predetermined container corresponding to the client signal according to the bit synchronous mapping. For another example, when the client signal is of a non-Ethernet type, the client signal is encoded according to the predetermined encoding format, and the encoded client signal is mapped into the predetermined container corresponding to the client signal according to bit synchronous mapping; when the client signal is of an Ethernet type, the client signal is mapped into the predetermined container corresponding to the client signal according to the bit synchronization mapping.

In an embodiment of the present disclosure, the configuration information of the predetermined container includes any one of the following: a serial number of the predetermined container, the number of first encoding blocks occupied by the predetermined container, or clock information of the predetermined container.

The part of the configuration information includes the serial number of the predetermined container, and the number of first encoding blocks occupied by the predetermined container and an other part of the configuration information. The other part of the configuration information includes the clock information of the predetermined container.

In an embodiment of the present disclosure, the sending module 1102 may carry the predetermined container and the configuration information of the predetermined container into the payload area of the OTN frame to perform the sending in any one of the methods described below.

In the methods described below, a first encoding block is an encoding block obtained by dividing the payload area of the OTN frame. The first encoding block has a fixed length, such as 66b, 257b or 512b, and different encoding block types have different formats.

In the division of the payload area of the OTN frame, if the length of the payload area of the OTN frame is not an integer multiple of the length of the first encoding block, then fixed bits are padded. For example, the size of the payload area of the OTN frame is 4×3808 bytes, that is, 121856 bits, which may be divided into L parts, where each part includes P bits of first encoding blocks and Q bits of padding. The bandwidth of each P bits of the first encoding blocks is equal to (P/121856) x the payload bandwidth of the OTN frame, and the padding bits may be used to carry some overhead.

In the methods described below, a special encoding block has a specific format and thus may be distinguished from the overhead encoding block and the payload encoding block in the predetermined container. For example, the special encoding block includes at least one of the following: a special idle encoding block (such as an idle (IDLE) encoding block), or an encoding block carrying the clock information of the predetermined container.

In the methods described below, the other part of the encoded configuration information has special encoding block type codes and may be distinguished from the overhead encoding block and the special idle encoding block of the predetermined container.

Method 1: When the part of configuration information of all predetermined containers are encoded according to a predetermined format, and an other part of the configuration information of each predetermined container is encoded according to the predetermined format, the number G3 of first encoding blocks required for the part of the encoded configuration information is determined, and the number G4 of first encoding blocks required for the predetermined container and the other part of the encoded configuration information is determined. The part of the encoded configuration information is carried into G3 first encoding blocks in the payload area of the OTN frame, and the predetermined container and the other part of the encoded configuration information in are carried into G4 first encoding blocks in the payload area of the OTN frame. The special idle encoding block is inserted to adjust the rate during the carrying process. The number G3 of first encoding blocks occupied by the part of the encoded configuration information is stored in the overhead of the OTN frame and sent.

In method 1, the step in which the number G3 of first encoding blocks required for the part of the encoded configuration information is determined includes any one of the following manners: the bandwidth of the part of the encoded configuration information is determined, and the number G3 of first encoding blocks required for the part of the encoded configuration information is determined according to the bandwidth of the part of the encoded configuration information and the bandwidth of the first encoding block; or the required number G3 of the part of the encoded configuration information is obtained according to at least the following parameters: the amount of client signals, the number of bits occupied by the serial number of the predetermined container which is in the configuration information, the number of bits occupied by the number of first encoding blocks occupied by the predetermined container and the other part of the encoded configuration information, the number of frames of the OTN multiframe required for completing the transmission of the part of the configuration information, and the length of the first encoding block. Specifically, the number G3 of first encoding blocks required for the part of the encoded configuration information may be calculated on the basis of the preceding parameters in any method. For example, the number G3 required for the part of the encoded configuration information is calculated according to the formula that $$G3 = \left\lceil \frac{P(K_1 + K_4)}{F_1 L} \right\rceil,$$

where G3 denotes the number of first encoding blocks required by the part of the encoded configuration information, P denotes the amount of client signals, K1 denotes the number of bits occupied by the serial number of the predetermined container which is in the configuration information, K4 denotes the number of bits occupied by the number of first encoding blocks occupied by the predetermined container and the other part of the encoded configuration information which is in the configuration information, F1 denotes the number of frames of the OTN multiframe required for completing the transmission of the part of the configuration information, and L denotes the length of the first encoding block. Certainly, the number G3 of first encoding blocks required for the part of the encoded configuration information may be calculated in other methods. Specific calculation methods are not intended to limit the scope of the embodiments of the present disclosure.

The step in which the bandwidth of the part of the encoded configuration information is determined includes that: the bandwidth of the part of the encoded configuration information is obtained according to at least the following parameters: the amount of client signals, the number of bits occupied by the serial number of the predetermined container, the number of bits occupied by the number of first encoding block occupied by the predetermined container and the other part of the encoded configuration information, the number of frames of the OTN multiframe required for completing the transmission of the part of the configuration information, and a period of an OTN frame carrying the predetermined container.

Specifically, the bandwidth of the part of the encoded configuration information may be calculated on the basis of the preceding parameters in any method. For example, the bandwidth of the part of the encoded configuration information is calculated according to the formula that $$Q2 = \frac{P(K_1 + K_4)}{F_1 P_0},$$

where Q2 denotes the bandwidth of the part of the encoded configuration information, P denotes the amount of client signals, K1 denotes the number of bits occupied by the serial number of the predetermined container, K4 denotes the number of bits occupied by the number of first encoding blocks occupied by the predetermined container and the other part of the encoded configuration information, F1 denotes the number of frames of the OTN multiframe required for completing the transmission of the part of the configuration information, and P0 denotes the period of the OTN frame carrying the predetermined container.

Certainly, the bandwidth of the part of the encoded configuration information may be calculated in other methods. Specific calculation methods are not intended to limit the scope of the embodiments of the present disclosure.

Specifically, the number G3 of first encoding blocks required for the part of the encoded configuration information may be calculated on the basis of the preceding parameters in any method.

For example, the step in which the number G3 of first encoding blocks required by the part of the encoded configuration information is determined according to the bandwidth of the part of the encoded configuration information and the bandwidth of the first encoding block includes that: the number G3 of first encoding blocks required for the part of the encoded configuration information is calculated according to the formula that $$G3 = \left\lceil \frac{Q2}{B} \right\rceil,$$

where G3 denotes the number of first encoding blocks required by the part of the encoded configuration information, Q2 denotes the bandwidth of the part of the encoded configuration information, and B denotes the bandwidth of the first encoding block.

Certainly, the number G3 of first encoding blocks required for the part of the encoded configuration information may be calculated in other methods. Specific calculation methods are not intended to limit the scope of the embodiments of the present disclosure.

In method 1, the step in which the number G4 of first encoding blocks required for the predetermined container and the other part of the encoded configuration information includes that: the bandwidth of the predetermined container and the other part of the encoded configuration information are determined, and the number G4 of first encoding blocks required for the predetermined container and the other part of the encoded configuration information is determined according to the bandwidth of the first encoding block and the bandwidth of the predetermined container and the other part of the encoded configuration information.

The step in which the bandwidth of the predetermined container and the other part of the encoded configuration information is determined includes that: when the part of the configuration information includes the amount of client signals and the number of first encoding blocks occupied by the predetermined container and the other part of the encoded configuration information, and the other part of the configuration information includes the clock information of the predetermined container, the bandwidth of the predetermined container and the other part of the encoded configuration information is obtained according to at least the following parameters: the bandwidth of the predetermined container, an encoding coefficient, the amount of client signals, the number of bits occupied by the other part of the configuration information, the number of frames of the OTN multiframe required for completing the transmission of the other part of the configuration information, and the length of the first encoding block.

The bandwidth of the predetermined container and the other part of the encoded configuration information is calculated according to the formula that $$Q3 = Q4 + \frac{aK_3}{F_2 L},$$

where Q3 denotes the bandwidth of the predetermined container and the other part of the encoded configuration information, Q4 denotes the bandwidth of the predetermined container, a denotes the encoding coefficient, P denotes the amount of client signals, K3 denotes the number of bits occupied by the other part of the configuration information, F2 denotes the number of frames of the OTN multiframe required for completing the transmission of the other part of the configuration information, L denotes the length of the first encoding block, and different client signals may have different F2.

Certainly, the bandwidth of the predetermined container and the other part of the encoded configuration information may be calculated in other methods. Specific calculation methods are not intended to limit the scope of the embodiments of the present disclosure.

The number G4 of first encoding blocks required for the predetermined container and the other part of the encoded configuration information may be determined on the basis of the bandwidth of the first encoding block and the bandwidth of the predetermined container and the other part of the encoded configuration information in any method. For example, the step in which the number G4 of first encoding blocks required by the predetermined container and the other part of the encoded configuration information is determined according to the bandwidth of the first encoding block and the bandwidth of the predetermined container and the other part of the encoded configuration information includes that: the number G4 of first encoding blocks required for the predetermined container and the part of the encoded configuration information is calculated according to the formula that $$G4 = \left\lceil \frac{Q3}{B} \right\rceil,$$

where G4 denotes the number of first encoding blocks required by the predetermined container and the other part of the encoded configuration information, Q3 denotes the bandwidth of the predetermined container and the other part of the encoded configuration information, and B denotes the bandwidth of the first encoding block.

Certainly, the number G4 of first encoding blocks required for the predetermined container and the other part of the encoded configuration information may be calculated in other methods. Specific calculation methods are not intended to limit the scope of the embodiments of the present disclosure.

In method 1, the step in which the part of the encoded configuration information is carried into the G3 first encoding blocks in the payload area of the OTN frame includes that: the positions of the G3 first encoding blocks in the payload area of the OTN frame are determined, and the part of the encoded configuration information is carried into the G3 first encoding blocks corresponding to the determined positions; the step in which the predetermined container and the other part of the encoded configuration information in are carried into the G4 first encoding blocks in the payload area of the OTN frame includes that: the positions of the G4 first encoding blocks in the payload area of the OTN frame are determined, and the predetermined container and the other part of the encoded configuration information are carried into the G4 first encoding blocks corresponding to the determined positions. Before the positions of first encoding blocks occupied by the all predetermined containers in the payload area of the OTN frame, the positions of the first encoding blocks occupied by the part of the encoded configuration information in the payload area of the OTN frame are firstly determined.

The step in which the positions of the G3 first encoding blocks in the payload area of the OTN frame includes that: the positions of the G3 first encoding blocks in the payload area of the OTN frame are calculated according to a sigma-delta algorithm, or the positions of the G3 first encoding blocks in the payload area of the OTN frame are determined to be the first G3 first encoding blocks in the payload area of the OTN frame, or the positions of the G3 first encoding blocks in the payload area of the OTN frame are determined to be the last G3 first encoding blocks in the payload area of the OTN frame, or the positions of the G3 first encoding blocks in the payload area of the OTN frame are determined to be G3 first encoding blocks in other fixed positions in the payload area of the OTN frame.

The step in which the positions of the G4 first encoding blocks in the payload area of the OTN frame are determined includes that: the positions of the G4 first encoding blocks among first encoding blocks other than the G3 first encoding blocks in the payload area according to the sigma-delta algorithm. It is to be noted that different predetermined containers may correspond to the same G4 or different G4. For example, when different predetermined containers correspond to the same G4, the positions of G4 first encoding blocks corresponding to a first predetermined container among the (M−G3) first encoding blocks in the payload area of the OTN frame are determined according to the sigma-delta algorithm, the positions of G4 first encoding blocks corresponding to a second predetermined container among the (M−G3−G4) first encoding blocks in the payload area of the OTN frame are determined according to the sigma-delta algorithm, the positions of G4 first encoding blocks corresponding to a third predetermined container among the (M−G3−2*G4) first encoding blocks in the payload area of the OTN frame according to the sigma-delta algorithm, and so on, until the positions of G4 first encoding blocks corresponding to each predetermined container are determined. M denotes the number of first encoding blocks included in the payload area of the OTN frame. When different predetermined containers correspond to different G4, the positions of G4 first encoding blocks among first encoding blocks other than the G3 first encoding blocks in the payload area may be determined in a similar manner.

The step in which the positions of the G4 first encoding blocks among the first encoding blocks other than the G3 first encoding blocks in the payload area are determined according to the sigma-delta algorithm includes that: predetermined containers are sorted, and the positions of the G4 first encoding blocks corresponding to the predetermined container among the first encoding blocks other than the G3 first encoding blocks in the payload area are determined according to the sorting sequence by using the sigma-delta algorithm.

The predetermined containers may be sorted in any sorting method. For example, the sorting is performed according to the bandwidths of the predetermined containers and encoded other part of the configuration information from large to small. This sorting method is combined with the sigma-delta algorithm, thereby homogenizing the payload area of the OTN frame.

In method 1, when the encoded parts of the configuration information of the all predetermined containers cannot fill the G3 first encoding blocks, padding information is inserted into the remaining positions in the G3 first encoding blocks. That is, there is the case where a part of one first encoding block is the part of the configuration information of the client signal, and a part of the one first encoding block is the padding information.

In method 1, the sending module 1102 is specifically configured to encode the part of the configuration information according to the predetermined format such that: sort the part of configuration information, and encode the sorted part of the configuration information according to the predetermined format.

The part of the configuration information may be sorted according to any sorting sequence. For example, the sorting is performed according to the bandwidths of the predetermined containers corresponding to the part of the configuration information from large to small.

Method 2: When the all configuration information of the all predetermined containers is encoded according to the predetermined format, the number G1 of first encoding blocks required for the encoded configuration information and the number G2 of first encoding blocks required by the predetermined container are determined. The encoded configuration information is carried into G1 first encoding blocks corresponding to a first predetermined position in the payload area of the OTN frame, and the predetermined container is carried into G2 first encoding blocks in the payload area of the OTN frame. The special encoding block is inserted during the mapping process to adjust the rate. The number G1 of first encoding blocks occupied by the encoded configuration information is stored in the overhead of the OTN frame and sent.

Method 2: The step in which the number G1 of first encoding blocks required for the encoded configuration information is determined includes any one of the following manners: the bandwidth of the encoded configuration information is determined, and the number G1 of first encoding blocks required for the encoded configuration information is calculated according to the bandwidth of the encoded configuration information and the bandwidth of the first encoding block; or the number G1 of first encoding blocks required for the encoded configuration information is obtained according to at least the following parameters: the amount of client signals, the number of bits occupied by the serial number of the predetermined container carrying the client signal which is in the configuration information, the number of bits occupied by the number of first encoding blocks occupied by the predetermined container which is in the configuration information, the number of bits occupied by the clock information of the predetermined container which is in the configuration information, the number of frames of the OTN multiframe required for completing the transmission of the configuration information of the predetermined container, and the length of the first encoding block. Specifically, the number G1 of first encoding blocks required for the encoded configuration information may be calculated on the basis of the preceding parameters in any method. For example, the number G1 of first encoding blocks required for the encoded configuration information is calculated according to the formula that $$G1 = \left\lceil \frac{P(K_1 + K_2 + K_3)}{F_3 L} \right\rceil,$$

where G1 denotes the number of first encoding blocks required by the encoded configuration information, P denotes the amount of client signals, K1 denotes the number of bits occupied by the serial number of the predetermined container carrying the client signal which is in the configuration information, K2 denotes the number of bits occupied by the number of first encoding blocks occupied by the predetermined container which is in the configuration information, K3 denotes the number of bits occupied by the clock information of the predetermined container which is in the configuration information, F3 denotes the number of frames of the OTN multiframe required for completing the transmission of the configuration information of the predetermined container, and L denotes the length of the first encoding block. Certainly, the number G1 of first encoding blocks required for the encoded configuration information may be calculated in other methods. Specific calculation methods are not intended to limit the scope of the embodiments of the present disclosure.

The bandwidth of the encoded configuration information is obtained according to at least the following parameters: an encoding coefficient (that is, the ratio of the number of bits occupied by the encoded configuration information to the number of bits occupied by the configuration information before the encoding), the amount of client signals, the number of bits occupied by the serial number of the predetermined container which is in the configuration information, the number of bits occupied by the number of first encoding blocks occupied by the predetermined container which is in the configuration information, the number of bits occupied by the clock information of the predetermined container which is in the configuration information, the number of frames of the OTN multiframe required for completing the transmission of the configuration information of the predetermined container, and the period of the OTN frame carrying the predetermined container.

Specifically, the bandwidth of the encoded configuration information may be calculated on the basis of the preceding parameters in any method. For example, the step in which the bandwidth of the encoded configuration information is determined includes that: the bandwidth of the encoded configuration information is calculated according to the formula that $$Q1 = \frac{\alpha P(K_1 + K_2 + K_3)}{F_3 P_0},$$

where Q1 denotes the bandwidth of the encoded configuration information, a denotes the encoding coefficient (that is, the ratio of the number of bits occupied by the encoded configuration information to the number of bits occupied by the configuration information before the encoding), P denotes the amount of the client signal, K1 denotes the number of bits occupied by the serial number of the predetermined container which is in the configuration information, K2 denotes the number of bits occupied by the number of first encoding blocks occupied by the predetermined container which is in the configuration information, K3 denotes the number of bits occupied by the clock information of the predetermined container which is in the configuration information, F3 denotes the number of frames of the OTN multiframe required for completing the transmission of the configuration information of the predetermined container, and P0 denotes the period of the OTN frame carrying the predetermined container.

Certainly, the bandwidth of the encoded configuration information may be calculated in other methods. Specific calculation methods are not intended to limit the scope of the embodiments of the present disclosure.

Specifically, the number G1 of first encoding blocks required for the encoded configuration information may be calculated on the basis of the bandwidth of the encoded configuration information and the bandwidth of the first encoding block in any method. For example, the step in which the number G1 of first encoding blocks required for calculating the encoded configuration information according to the bandwidth of the encoded configuration information and the bandwidth of the first encoding block includes that: the number G1 of first encoding blocks required for the encoded configuration information is calculated according to the formula that $$G1 = \left\lceil \frac{Q1}{B} \right\rceil,$$

where G1 denotes the number of first encoding blocks required for the encoded configuration information, Q1 denotes the bandwidth of the encoded configuration information, and B denotes the bandwidth of the first encoding block.

Certainly, the number G1 of first encoding blocks required for the encoded configuration information may be calculated in other methods. Specific calculation methods are not intended to limit the scope of the embodiments of the present disclosure.

In method 2, the step in which the encoded configuration information is carried into the G1 first encoding blocks in the payload area of the OTN frame includes that: the positions of the G1 first encoding blocks in the payload area of the OTN frame are determined, and the encoded configuration information is carried into the G1 first encoding blocks corresponding to the determined positions; the step in which the predetermined container is carried into the G2 first encoding blocks in the payload area of the OTN frame includes that: the positions of the G2 first encoding blocks in the payload area of the OTN frame are determined, the predetermined container is carried into the G2 first encoding blocks corresponding to the determined positions. Before the positions of first encoding blocks occupied by the all predetermined containers in the payload area of the OTN frame are determined, the positions of first encoding blocks occupied by the configuration information in the payload area of the OTN frame are firstly determined.

The step in which the positions of the G1 first encoding blocks in the payload area of the OTN frame are determined includes that: the positions of the G1 first encoding blocks in the payload area of the OTN frame are calculated according to a sigma-delta algorithm, or the positions of the G1 first encoding blocks in the payload area of the OTN frame are determined to be the first G1 first encoding blocks in the payload area of the OTN frame, or the positions of the G1 first encoding blocks in the payload area of the OTN frame are determined to be the last G1 first encoding blocks in the payload area of the OTN frame, or the positions of the G1 first encoding blocks in the payload area of the OTN frame are determined to be G1 first encoding blocks in other fixed positions in the payload area of the OTN frame.

The step in which the positions of the G2 first encoding blocks in the payload area of the OTN frame are determined includes that: the positions of the G2 first encoding blocks among first encoding blocks other than the G1 first encoding blocks in the payload area of the OTN frame are determined according to the sigma-delta algorithm, and the predetermined container is carried into the G2 first encoding blocks corresponding to the determined positions.

The step in which the positions of the G2 first encoding blocks among the first encoding blocks other than the G1 first encoding blocks in the payload area of the OTN frame are determined according to the sigma-delta algorithm includes that: predetermined containers are sorted, and the positions of the G2 first encoding blocks among the first encoding blocks other than the G1 first encoding blocks in the payload area of the OTN frame are determined according to the sorting sequence by using the sigma-delta algorithm. It is to be noted that different predetermined containers may correspond to the same G2 or different G2. For example, when different predetermined containers correspond to the same G2, the positions of G2 first encoding blocks corresponding to a first predetermined container among the (M−G1) first encoding blocks in the payload area of the OTN frame are determined according to the sigma-delta algorithm, the positions of G2 first encoding blocks corresponding to a second predetermined container among the (M−G1−G2) first encoding blocks in the payload area of the OTN frame are determined according to the sigma-delta algorithm, the positions of G2 first encoding blocks corresponding to a third predetermined container among the (M−G1−2*G2) first encoding blocks in the payload area of the OTN frame according to the sigma-delta algorithm, and so on, until the positions of G2 first encoding blocks corresponding to each predetermined container are determined. M denotes the number of first encoding blocks included in the payload area of the OTN frame. When different predetermined containers correspond to different G2, the positions of the G2 first encoding blocks among the first encoding blocks other than the G1 first encoding blocks in the payload area may be determined in a similar manner.

The sorting may be performed in any sorting method. For example, the sorting is performed according to the bandwidths of the predetermined containers from large to small. This sorting method is combined with the sigma-delta algorithm, thereby homogenizing the payload area of the OTN frame.

In method 2, when encoded configuration information of the all predetermined containers cannot fill the G1 first encoding blocks, padding information is inserted into the remaining positions in the G1 first encoding blocks.

In method 2, the sending module 1102 is specifically configured to encode the configuration information of the predetermined container according to the predetermined format such that: sort configuration information, and encode the sorted configuration information according to the predetermined format.

The configuration information may be sorted according to any sorting sequence. For example, the sorting is performed according to the bandwidths of predetermined containers corresponding to the configuration information from large to small.

In an embodiment of the present disclosure, the OTN frame may be mapped into a higher order container and sent out via a corresponding interface. The high order container may be an HO ODUk. The interface may be OTUk or FlexO.

According to the embodiments of the present disclosure, the configuration information is carried into the payload area of the OTN frame and sent, instead of being transmitted by using many OTN frames, thereby improving the transmission efficiency of the configuration information.

Figure 12:
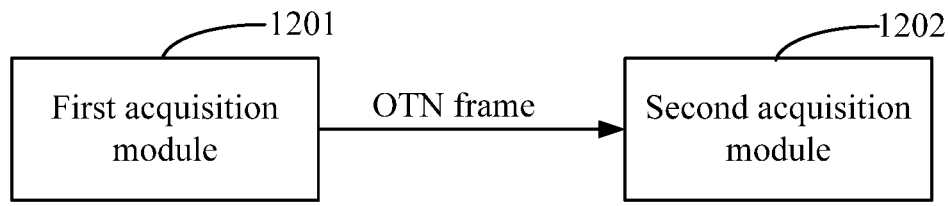
FIG. 12 is a structural diagram of an apparatus for transmitting configuration information according to another embodiment of the present disclosure.

Referring to FIG. 12, another embodiment of the present disclosure provides an apparatus for transmitting configuration information. The apparatus includes a first acquisition module 1201 and a second acquisition module 1202.

The first acquisition module 1201 is configured to acquire an OTN frame. A payload area of the OTN frame carries a predetermined container and configuration information of the predetermined container. The second acquisition module 1202 is configured to acquire the configuration information and the predetermined container from the payload area of the OTN frame, and acquire a client signal from the predetermined container.

In an embodiment of the present disclosure, the first acquisition module 1201 is configured to receive a high order container from a corresponding interface, and perform demapping on the high order container to obtain the OTN frame.

In an embodiment of the present disclosure, the configuration information of the predetermined container includes any one of the following: a serial number of a client signal, the number of first encoding blocks occupied by the predetermined container, or clock information of the predetermined container.

A part of the configuration information includes: the serial number of the client signal, and the number of first encoding blocks occupied by the predetermined container and an other part of the configuration information. The other part of the configuration information includes clock information of the predetermined container.

In an embodiment of the present disclosure, the second acquisition module 1202 is specifically configured to acquire the configuration information and the predetermined container from the payload area of the OTN frame such that: acquire the part of the configuration information from the payload area of the OTN frame, and the predetermined container and the other part of the configuration information are acquired from the payload area of the OTN frame according to the part of the configuration information; or acquire the configuration information from the payload area of the OTN frame, and acquire the predetermined container from the payload area of the OTN frame according to the configuration information.

The second acquisition module 1202 is specifically configured to acquire the part of the configuration information from the payload area of the OTN frame such that: acquire the number G3 of first encoding blocks occupied by the part of the encoded configuration information from the overhead of the OTN frame, determine the positions of G3 first encoding blocks in the payload area of the OTN frame, extract G3 first encoding blocks from the determined positions in the payload area of the OTN frame, and decode a data stream in the G3 first encoding blocks to obtain the configuration information. Alternatively, the second acquisition module 1202 is specifically configured to acquire the configuration information from the payload area of the OTN frame such that: acquire the number G1 of first encoding blocks occupied by the encoded configuration information from the overhead of the OTN frame, determine the positions of G1 first encoding blocks in the payload area of the OTN frame, extract G1 first encoding blocks from the determined positions in the payload area of the OTN frame, and decode a data stream in the G1 first encoding blocks to obtain the configuration information. A first encoding block is an encoding block obtained by dividing the payload area of the OTN frame.

The second acquisition module 1202 is specifically configured to determine the positions of G3 first encoding blocks in the payload area of the OTN frame such that: the positions of G3 first encoding blocks in the payload of the OTN frame are determined according to a sigma-delta algorithm, or the positions of G3 first encoding blocks in the payload area of the OTN frame are determined to be the first G3 first encoding blocks in the payload area of the OTN frame, or the positions of G3 first encoding blocks in the payload area of the OTN frame are determined to be the last G3 first encoding blocks in the payload area of the OTN frame.

The second acquisition module 1202 is specifically configured to determine the positions of G1 first encoding blocks in the payload area of the OTN frame such that: the positions of G1 first encoding blocks in the payload of the OTN frame are determined according to a sigma-delta algorithm, or the positions of G1 first encoding blocks in the payload area of the OTN frame are determined to be the first G1 first encoding blocks in the payload area of the OTN frame, or the positions of G1 first encoding blocks in the payload area of the OTN frame are determined to be the last G1 first encoding blocks in the payload area of the OTN frame.

The second acquisition module 1202 is specifically configured to acquire the predetermined container from the payload area of the OTN frame according to the configuration information such that: acquire, according to the configuration information of the predetermined container, the number G2 of first encoding blocks occupied by the predetermined container; and determine, according to a sigma-delta algorithm, the positions of G2 first encoding blocks occupied by the predetermined container in the payload area of the OTN frame are acquired. Specifically, the positions of the G2 first encoding blocks occupied by the predetermined container in the payload area of the OTN frame are determined according a sorting sequence at a sending end by using the sigma-delta algorithm; a traffic data stream is extracted from the G2 first encoding blocks corresponding to the determined positions in the payload area of the OTN frame; and a special encoding block in the traffic data stream is identified and deleted to obtain the predetermined container.

In an embodiment of the present disclosure, the second acquisition module 1202 is specifically configured to acquire the client signal from the predetermined container such that: perform frame synchronization processing on the predetermined container, and acquire the client signal from the payload of the predetermined container.

The second acquisition module 1202 is specifically configured to acquire the client signal from the payload of the predetermined container such that: acquire a client signal data stream from the payload of the predetermined container to directly obtain the client signal, or extract a client signal data stream from the payload of the predetermined container, and decode or transcode the client signal data stream according to a predetermined encoding format to obtain the client signal.

For example, the client signal data stream is extracted from the payload of the predetermined container to directly obtain the client signal. For another example, the client signal data stream is extracted from the payload of the predetermined container, and the client signal data stream is decoded or transcoded according to the predetermined encoding format to obtain the client signal. For another example, when the client signal is of a non-Ethernet type, the client signal data stream is extracted from the payload of the predetermined container, and the customer service data stream is decoded according to the predetermined encoding format to obtain the client signal; when the client signal is of an Ethernet type, the client signal data stream is extracted from the payload of the predetermined container, and the client signal data stream is transcoded according to the predetermined encoding format to obtain the client signal. For another example, when the client signal is of a non-Ethernet type, the client signal data stream is extracted from the payload of the predetermined container, and the client signal data stream is decoded according to the predetermined encoding format to obtain the client signal; when the client signal is of an Ethernet type, the client signal data stream is extracted from the payload of the predetermined container to directly obtain the client signal.

Another embodiment of the present disclosure provides an apparatus for transmitting configuration information. The apparatus includes a processor and a computer-readable storage medium. The computer-readable storage medium stores instructions. When the instructions are executed by the processor, any method for transmitting configuration information described above is implemented.

Another embodiment of the present disclosure provides a computer-readable storage medium. The computer-readable storage medium stores a computer program. The computer program, when executed by a processor, implements any method for transmitting configuration information described above.

Figure 13:
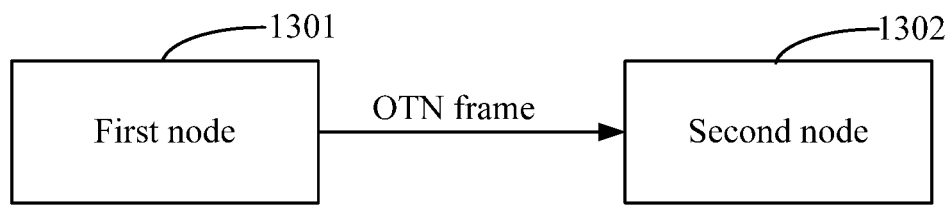
FIG. 13 is a structural diagram of a system for transmitting configuration information according to another embodiment of the present disclosure.

Referring to FIG. 13, another embodiment of the present disclosure provides a system for transmitting configuration information. The system includes a first node 1301 and a second mode 1302. The first node 1301 is configured to map a client signal into a predetermined container corresponding to the client signal, encode configuration information of the predetermined container according to a predetermined format, and send the OTN frame that carries the predetermined container and the encoded configuration information of the predetermined container in the payload area. The second node 1302 is configured to acquire an OTN frame, where a payload area of the OTN frame carries a predetermined container and configuration information of the predetermined container, acquire the configuration information and the predetermined container from the payload area of the OTN frame, and acquire a client signal from the predetermined container.

The specific implementation modes of the first node 1301 and the second node 1302 described above is the same as the specific implementation modes of the methods of transmitting configuration information in the embodiments described above, which are not repeated here.

It is to be understood by those having ordinary skill in the art that some or all steps of the preceding method and function modules/units in the preceding system or apparatus may be implemented as software, firmware, hardware and suitable combinations thereof. In the hardware implementation, the division of the function modules/units described above may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random access memory (RAM), a read-only memory (ROM), an electrically erasable programmable read-only memory (EEPROM), a flash memory or another memory technology, a compact disc read-only memory (CD-ROM), a digital versatile disc (DVD) or another optical disc storage, a magnetic cassette, a magnetic tape, disk storage or another magnetic storage apparatus, or any other medium that is used to store the desired information and that can be accessed by a computer. Moreover, as is known to those having ordinary skill in the art, communication media generally include computer-readable instructions, data structures, program modules or other data in carriers or in modulated data signals transported in other transport mechanisms and may include any information delivery medium.

What is claimed is:

1. A method for transmitting configuration information, comprising:
   mapping a client signal into a predetermined container corresponding to the client signal;
   encoding configuration information of the predetermined container according to a predetermined format; and
   sending the optical transport network frame that carries the predetermined container and the encoded configuration information of the predetermined container in the payload area;
   wherein encoding the configuration information of the predetermined container according to the predetermined format comprises:
   encoding a part of the configuration information of the predetermined container separately according to the predetermined format, and encoding an other part of the configuration information of the predetermined container separately according to the predetermined format;
   wherein the configuration information of the predetermined container comprises: a serial number of the predetermined container, a number of first encoding blocks occupied by the predetermined container, and clock information of the predetermined container,
   wherein a first encoding block is an encoding block obtained by dividing the payload area of the optical transport network frame.

2. The method of claim 1, wherein encoding the configuration information of the predetermined container according to the predetermined format further comprises:
   sending the optical transport network frame that carries the predetermined container and the encoded configuration information of the predetermined container in the payload area comprises:
   determining a number G3 of first encoding blocks required for the part of encoded configuration information of the predetermined container and a number G4 of first encoding blocks required for the predetermined container and the other part of the encoded configuration information of the predetermined container;
   carrying the part of the encoded configuration information of the predetermined container into G3 first encoding blocks in the payload area of the optical transport network frame, and carrying the predetermined container and the other part of the encoded configuration information of the predetermined container into G4 first encoding blocks in the payload area of the optical transport network frame; and
   carrying the number G3 of first encoding blocks occupied by the part of the encoded configuration information of the predetermined container into overhead of the optical transport network frame for sending,
   wherein a first encoding block is an encoding block obtained by dividing the payload area of the optical transport network frame.

3. The method of claim 2, wherein determining the number G3 of first encoding blocks required for the part of the encoded configuration information of the predetermined container comprises:
   in a case where the part of the encoded configuration information of the predetermined container comprises the serial number of the predetermined container carrying the client signal and the number of first encoding blocks occupied by the predetermined container and the other part of the encoded configuration information of the predetermined container, and the other part of the encoded configuration information of the predetermined container comprises clock information of the predetermined container, obtaining the number G3 of first encoding blocks required for the part of the encoded configuration information of the predetermined container at least through the following parameters:
   an amount of client signals, a number of bits occupied by the number of the predetermined container which is in the configuration information, a number of bits occupied by the number of first encoding blocks occupied by the predetermined container and the other part of the encoded configuration information of the predetermined container, a number of frames of an optical transport network multiframe required for completing transmission of the part of the encoded configuration information of the predetermined container, and a length of the first encoding block.

4. The method of claim 2, wherein determining the number G4 of first encoding blocks required for the predetermined container and the other part of the encoded configuration information about the predetermined container comprises:

determining a bandwidth of the predetermined container and the other part of the encoded configuration information of the predetermined container; and determining, according to the bandwidth of the predetermined container and the other part of the encoded configuration information of the predetermined container and a bandwidth of the first encoding block, the number G4 of first encoding blocks required for the predetermined container and the other part of the encoded configuration information of the predetermined container;

wherein determining the bandwidth of the predetermined container and the other part of the encoded configuration information about the predetermined container comprises:

in a case where the part of the encoded configuration information of the predetermined container comprises the serial number of the predetermined container and the number of first encoding blocks occupied by the predetermined container and the other part of the encoded configuration information of the predetermined container, and the other part of the encoded configuration information of the predetermined container comprises clock information of the predetermined container, obtaining the bandwidth of the predetermined container and the other part of the encoded configuration information of the predetermined container at least through the following parameters:

a bandwidth of the predetermined container, an encoding coefficient, a number of bits occupied by the other part of the encoded configuration information of the predetermined container, a number of frames of an optical transport network multiframe required for completing transmission of the other part of the encoded configuration information of the predetermined container, and a length of the first encoding block.

5. The method of claim 2, wherein carrying the part of the encoded configuration information of the predetermined container into the G3 first encoding blocks in the payload area of the optical transport network frame comprises:

determining positions of the G3 first encoding blocks in the payload area of the optical transport network frame; and carrying the part of the encoded configuration information of the predetermined container into the G3 first encoding blocks corresponding to the determined positions; and carrying the predetermined container and the other part of the encoded configuration information of the predetermined container into the G4 first encoding blocks in the payload area of the optical transport network frame comprises:

determining positions of the G4 first encoding blocks in the payload area of the optical transport network frame; and carrying the predetermined container and the other part of the encoded configuration information of the predetermined container into the G4 first encoding blocks corresponding to the determined positions, wherein, before determining positions of first encoding blocks occupied by all predetermined containers in the payload area of the optical transport network frame, the positions of the first encoding blocks occupied by the part of the encoded configuration information of the predetermined container in the payload area of the optical transport network frame are determined;

wherein determining the positions of the G3 first encoding blocks in the payload area of the optical transport network frame comprises:

determining the positions of the G3 first encoding blocks in the payload area of the optical transport network frame according to a sigma-delta algorithm; or determining the positions of the G3 first encoding blocks in the payload area of the optical transport network frame to be first G3 first encoding blocks in the payload area of the optical transport network frame; or determining the positions of the G3 first encoding blocks in the payload area of the optical transport network frame to be last G3 first encoding blocks in the payload area of the optical transport network frame.

6. The method of claim 2, wherein in a case where the part of the encoded configuration information of all predetermined containers are not capable to fill the G3 first encoding blocks, padding information is inserted into remaining positions in the G3 first encoding blocks.

7. The method of claim 1, wherein sending the optical transport network frame that carries the predetermined container and the encoded configuration information of the predetermined container in the payload area comprises:

determining a number G1 of first encoding blocks required for the encoded configuration information of the predetermined container;

carrying the encoded configuration information of the predetermined container into G1 first encoding blocks in the payload area of the optical transport network frame; and carrying the number G1 of first encoding blocks occupied by the encoded configuration information of the predetermined container into overhead of the optical transport network frame for transmission.

8. The method of claim 7, wherein determining the number G1 of first encoding blocks required for the encoded configuration information of the predetermined container comprises:

determining the number G1 of first encoding blocks required for the encoded configuration information of the predetermined container at least through the following parameters:

an amount of client signals, a number of bits occupied by the number of the predetermined container carrying the client signal which is in the configuration information, a number of bits occupied by a number of first encoding blocks occupied by the predetermined container which is in the configuration information, a number of bits occupied by clock information of the predetermined container which is in the configuration information, a number of frames of an optical transport network multiframe required for completing transmission of the configuration information of the predetermined container, and a length of the first encoding block.

9. The method of claim 7, wherein carrying the encoded configuration information of the predetermined container into the G1 first encoding blocks in the payload area of the optical transport network frame comprises:

determining positions of the G1 first encoding blocks in the payload area of the optical transport network frame; and carrying the encoded configuration information into the G1 first encoding blocks corresponding to the determined positions, wherein before determining a position of the predetermined container in the payload area of the optical transport network frame, the positions of the first encoding blocks occupied by the encoded configuration information of the predetermined container in the payload area of the optical transport network frame are determined.

10. The method of claim 9, wherein determining the positions of the G1 first encoding blocks in the payload area of the optical transport network frame comprises:
 determining the positions of the G1 first encoding blocks in the payload area of the optical transport network frame according to a sigma-delta algorithm; or
 determining the G1 first encoding blocks in the payload area of the optical transport network frame to be first G1 first encoding blocks in the payload area of the optical transport network frame; or
 determining the G1 first encoding blocks in the payload area of the optical transport network frame to be last G1 first encoding blocks in the payload area of the optical transport network frame.

11. The method of claim 1, wherein encoding the configuration information about the predetermined container according to the predetermined format comprises:
 sorting configuration information of predetermined containers; and
 encoding the sorted configuration information of the predetermined containers according to the predetermined format.

12. The method of claim 11, wherein sorting the configuration information of the predetermined containers comprises:
 sorting the configuration information according to bandwidths of the predetermined containers which correspond to the configuration information about the predetermined containers from large to small.

13. A method for transmitting configuration information, comprising:
 acquiring an optical transport network frame, wherein a predetermined container and configuration information about the predetermined container are carried in a payload area of the optical transport network frame; and
 acquiring the configuration information and the predetermined container from the payload area of the optical transport network frame, and acquiring a client signal from the predetermined container;
 wherein acquiring the configuration information and the predetermined container from the payload area of the optical transport network frame comprises:
 acquiring a part of the configuration information from the payload area of the optical transport network frame, and acquiring the predetermined container and an other part of the configuration information from the payload area of the optical transport network frame according to the part of the configuration information;
 wherein acquiring the part of the configuration information from the payload area of the optical transport network frame comprises:
 acquiring, from overhead of the optical transport network frame, a number G3 of first encoding blocks occupied by the part of the encoded configuration information;
 determining positions of G3 first encoding blocks in the payload area of the optical transport network frame, and extracting the G3 first encoding blocks from the determined positions in the payload area of the optical transport network frame; and
 decoding a data stream in the G3 first encoding blocks to obtain the configuration information; and acquiring the configuration information from the payload area of the optical transport network frame comprises:
 acquiring, from the overhead of the optical transport network frame, a number G1 of first encoding blocks occupied by encoded configuration information;
 determining positions of G1 first encoding blocks in the payload area of the optical transport network frame, and extracting the G1 first encoding blocks from the determined positions in the payload area of the optical transport network frame; and
 decoding a data stream in the G1 first encoding blocks to obtain the configuration information,
 wherein a first encoding block is an encoding block obtained by dividing the payload area of the optical transport network frame.

14. The method of claim 13, wherein determining the positions of the G3 first encoding blocks in the payload area of the optical transport network frame comprises:
 determining the positions of the G3 first encoding blocks in the payload area of the optical transport network frame according to a sigma-delta algorithm; or
 determining the G3 first encoding blocks in the payload area of the optical transport network frame to be first G3 first encoding blocks in the payload area of the optical transport network frame; or
 determining the G3 first encoding blocks in the payload area of the optical transport network frame to be last G3 first encoding blocks in the payload area of the optical transport network frame.

15. The method of claim 13, wherein determining the positions of the G1 first encoding blocks in the payload area of the optical transport network frame comprises:
 determining the positions of the G1 first encoding blocks in the payload area of the optical transport network frame according to a sigma-delta algorithm; or
 determining the G1 first encoding blocks in the payload area of the optical transport network frame to be first G1 first encoding blocks in the payload area of the optical transport network frame; or
 determining the G1 first encoding blocks in the payload area of the optical transport network frame to be last G1 first encoding blocks in the payload area of the optical transport network frame.

16. An apparatus for transmitting configuration information, comprising:
 a processor and a memory storing processor-executable instructions which, when executed by the processor, are configured to performs:
 mapping a client signal into a predetermined container corresponding to the client signal;
 encoding configuration information of the predetermined container according to a predetermined format; and
 sending the optical transport network frame that carries the predetermined container and the encoded configuration information of the predetermined container in the payload area;
 wherein encoding the configuration information of the predetermined container according to the predetermined format comprises:
 encoding a part of the configuration information of the predetermined container separately according to the predetermined format, and encoding an other part of the configuration information of the predetermined container separately according to the predetermined format;
 wherein the configuration information of the predetermined container comprises: a serial number of the predetermined container, a number of first encoding blocks occupied by the predetermined container, and clock information of the predetermined container, wherein a first encoding block is an encoding block obtained by dividing the payload area of the optical transport network frame.

17. An apparatus for transmitting configuration information, comprising:

a processor and a memory storing processor-executable instructions which, when executed by the processor, are configured to implement the method of claim 13.

* * * * *